US010556507B2

(12) United States Patent
Park et al.

(10) Patent No.: US 10,556,507 B2
(45) Date of Patent: Feb. 11, 2020

(54) VEHICLE CONTROL DEVICE PROVIDED IN VEHICLE AND METHOD FOR CONTROLLING VEHICLE

(71) Applicant: LG Electronics Inc., Seoul (KR)

(72) Inventors: Hunbae Park, Seoul (KR); Yeongjoong Kim, Seoul (KR); Jangkon Lee, Seoul (KR); Munchae Joung, Seoul (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 15/831,890

(22) Filed: Dec. 5, 2017

(65) Prior Publication Data
US 2018/0154774 A1   Jun. 7, 2018

Related U.S. Application Data

(60) Provisional application No. 62/430,893, filed on Dec. 6, 2016.

(30) Foreign Application Priority Data

Oct. 23, 2017  (KR) .................. 10-2017-0137559

(51) Int. Cl.
*B60K 35/00* (2006.01)
*B60K 37/06* (2006.01)
(Continued)

(52) U.S. Cl.
CPC .............. *B60K 35/00* (2013.01); *B60K 37/06* (2013.01); *B60R 11/0229* (2013.01); *G02B 27/0101* (2013.01); *G02B 27/0149* (2013.01); *B60K 2370/52* (2019.05); *B60K 2370/67* (2019.05); *G02B 2027/0156* (2013.01)

(58) Field of Classification Search
CPC .. B60K 35/00; B60K 37/06; B60K 2370/145; B60K 2370/126; B60K 2370/00; G06F 3/04847; G06F 3/0362; G06F 3/038; G06F 1/1654; G06F 2203/04805; G09G 2380/10
See application file for complete search history.

(56) References Cited

U.S. PATENT DOCUMENTS

| 5,347,265 A | 9/1994 | Shimura |
| 2009/0189829 A1 | 7/2009 | Hiramatsu |

(Continued)

FOREIGN PATENT DOCUMENTS

| FR | 3041445 | * 3/2017 |
| JP | 2002328331 | 11/2002 |

(Continued)

OTHER PUBLICATIONS

Extended European Search Report in European Application No. 17205633.5, dated Mar. 20, 2018, 9 pages.

Primary Examiner — Michael J Zanelli
(74) Attorney, Agent, or Firm — Fish & Richardson P.C.

(57) ABSTRACT

Disclosed are a vehicle control device provided in a vehicle and a method for controlling a vehicle. The vehicle control device includes a display unit, a detachable interface device detachably attached to the display unit, and a processor controlling at least one of the display unit and the detachable interface device according to a preset scheme when the detachable interface device is attached to or detached from the display unit.

22 Claims, 30 Drawing Sheets

(51) Int. Cl.
*B60R 11/02* (2006.01)
*G02B 27/01* (2006.01)

(56) References Cited

U.S. PATENT DOCUMENTS

| | | | | |
|---|---|---|---|---|
| 2013/0274997 | A1* | 10/2013 | Chien | G06F 17/00 |
| | | | | 701/36 |
| 2014/0350784 | A1* | 11/2014 | Imai | G06F 3/0412 |
| | | | | 701/36 |
| 2015/0084886 | A1* | 3/2015 | Kamiyama | G06F 3/03548 |
| | | | | 345/173 |
| 2017/0153718 | A1* | 6/2017 | Brown | G06F 3/0412 |
| 2018/0011556 | A1* | 1/2018 | Minyu | G06F 3/0487 |
| 2018/0107320 | A1* | 4/2018 | Im | G06F 3/0482 |

FOREIGN PATENT DOCUMENTS

| | | |
|---|---|---|
| JP | 2004355135 A | 12/2004 |
| KR | 1020060086656 | 8/2006 |
| KR | 1020080025793 | 3/2008 |
| KR | 1020120124518 | 11/2012 |
| WO | WO2004091956 A | 10/2004 |
| WO | WO2013074897 A | 5/2013 |

\* cited by examiner

FIG. 1
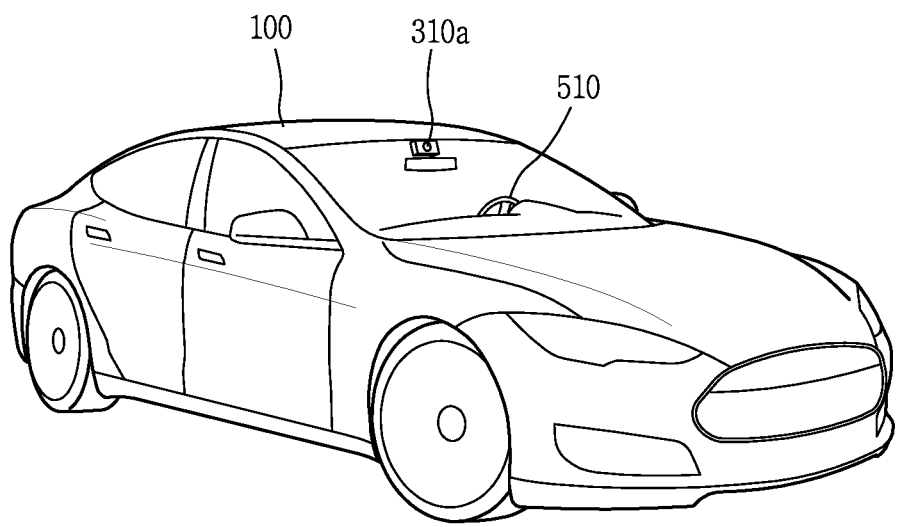
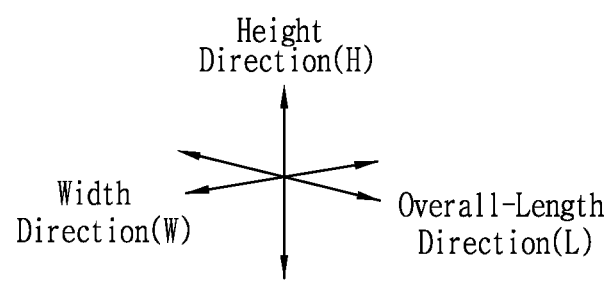

FIG. 10A
(a) 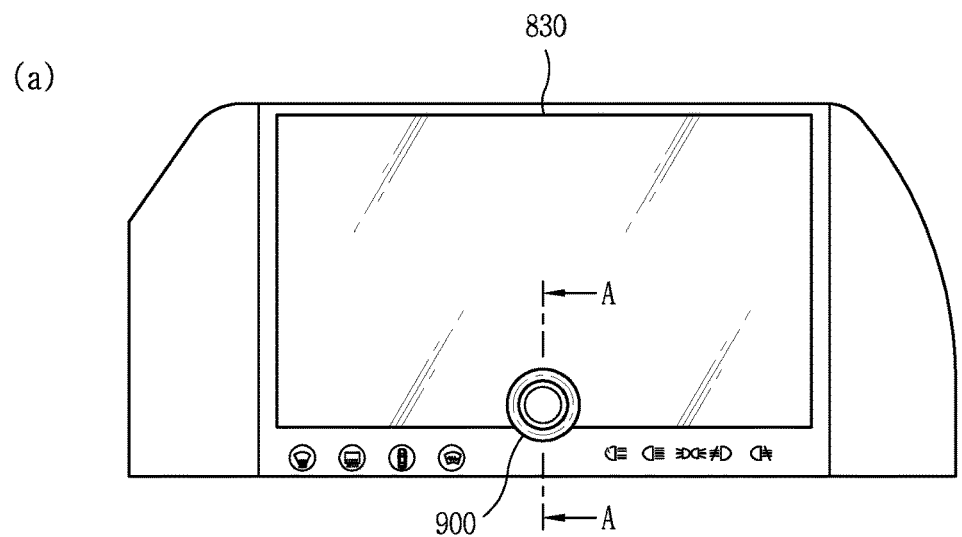
(b) 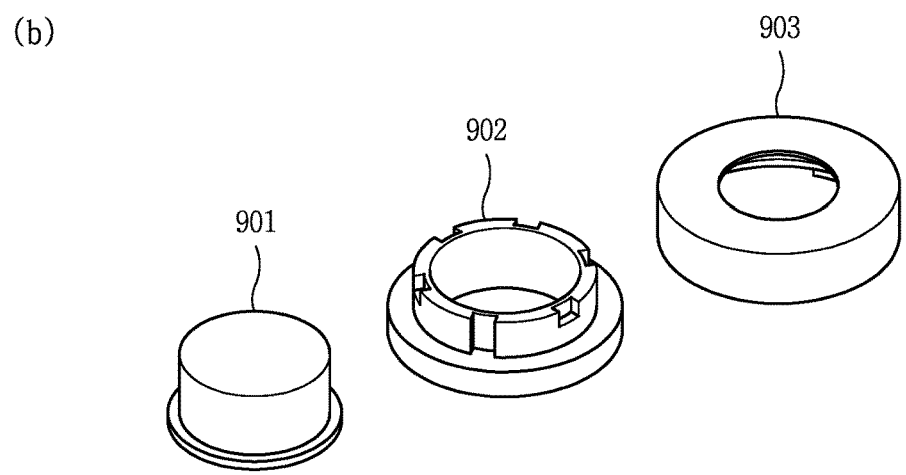
(c) 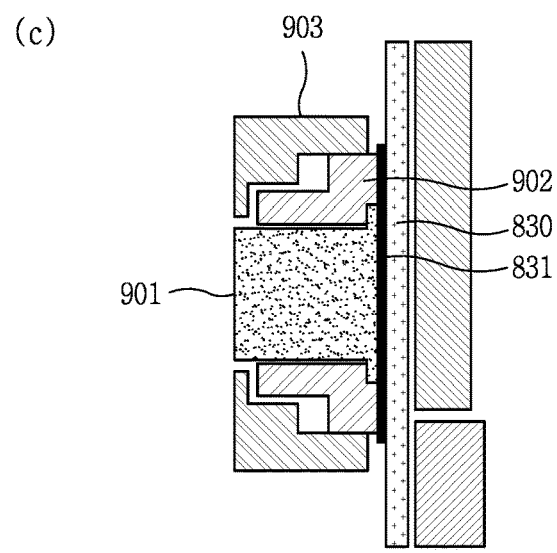

[Before push]
(a)

[After push]
(b)

FIG. 13
(a)
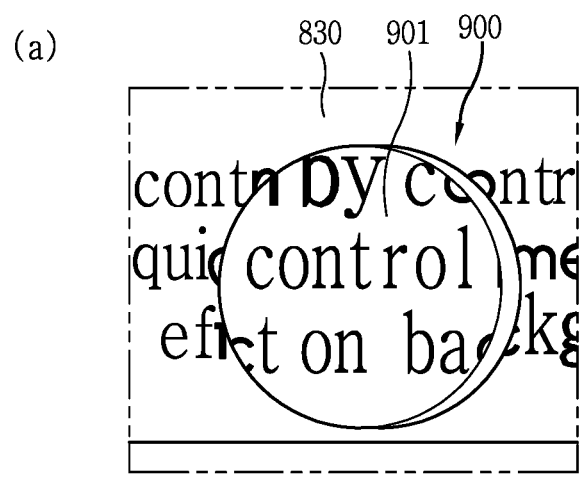
(b)
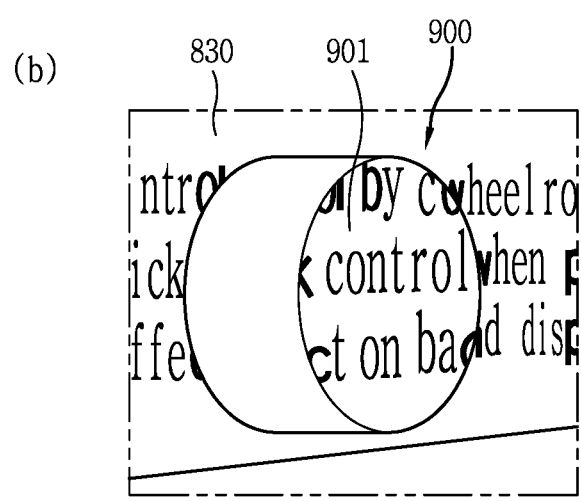

(a)  (b)

FIG. 17B
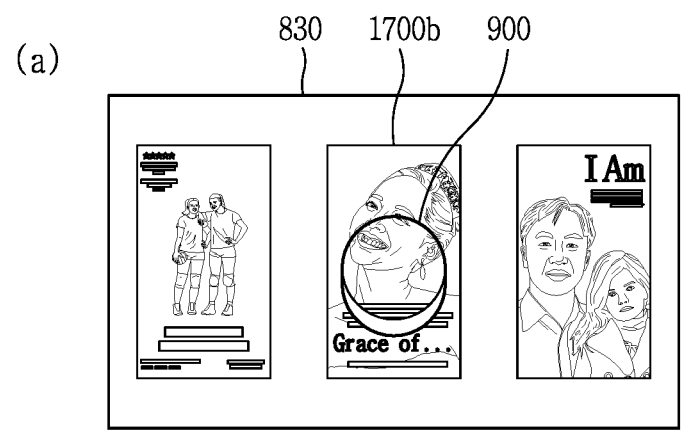
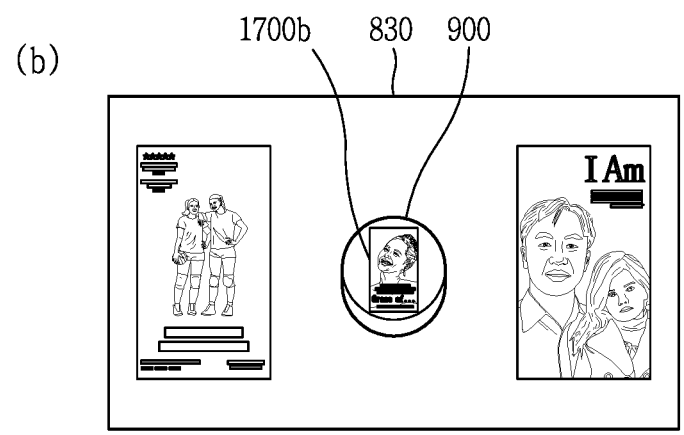

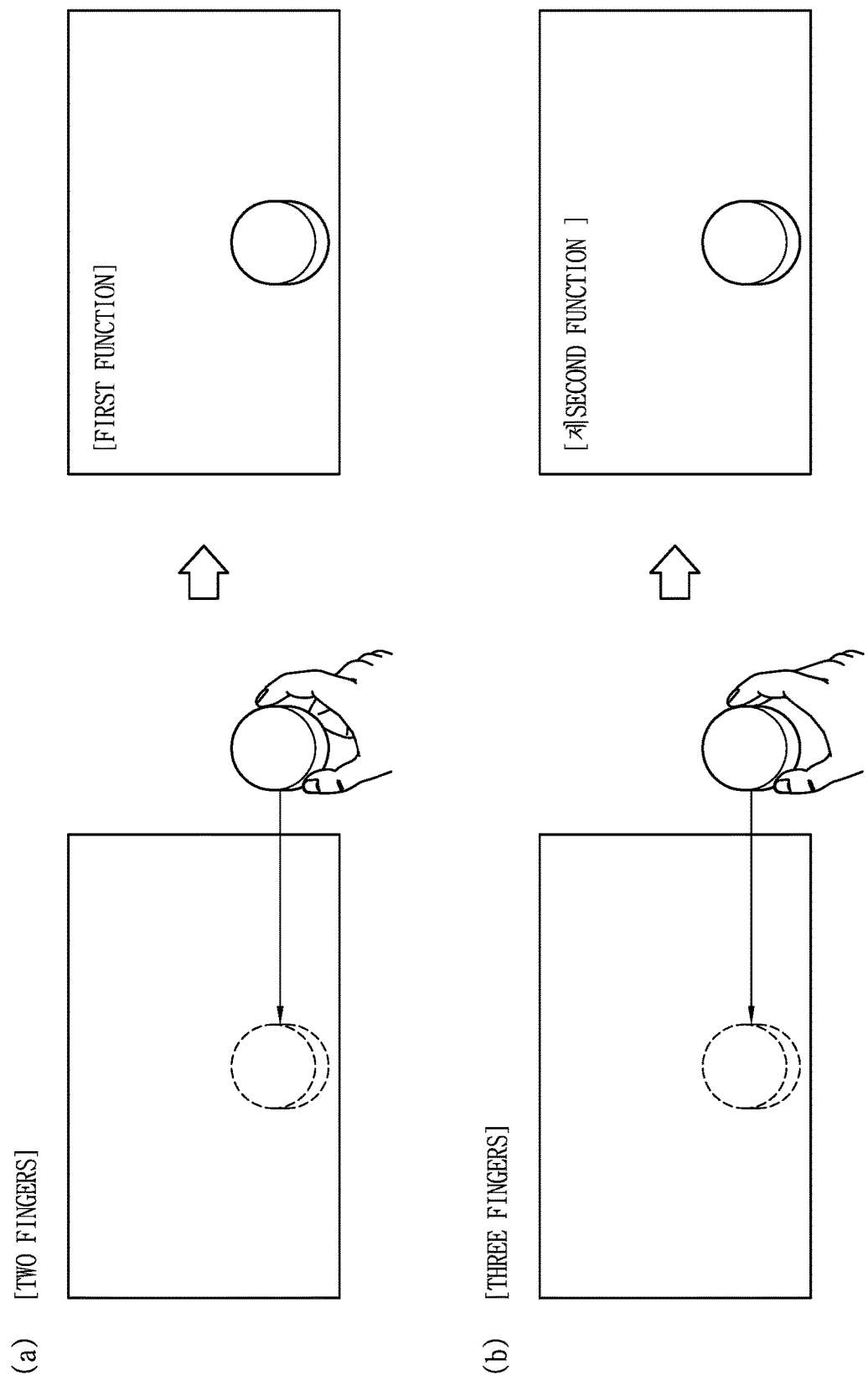

FIG. 19A
(a)
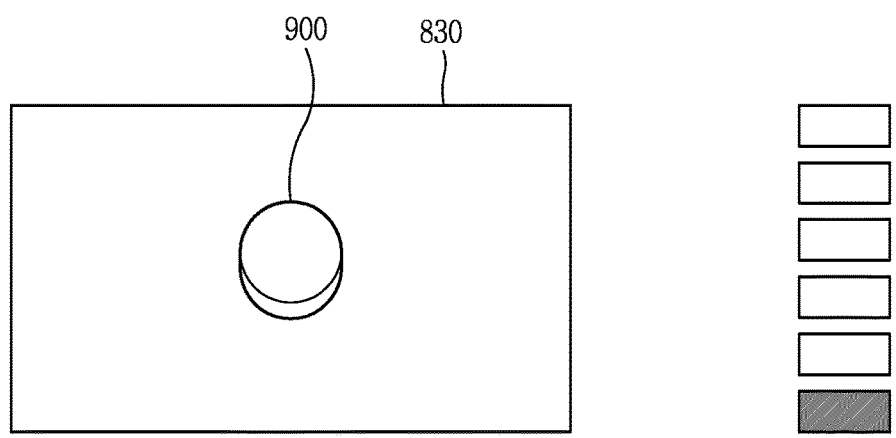
[AUTONOMOUS DRIVING MODE]   [MAGNETIC FORCE-FIRST STRENGTH]
(b)
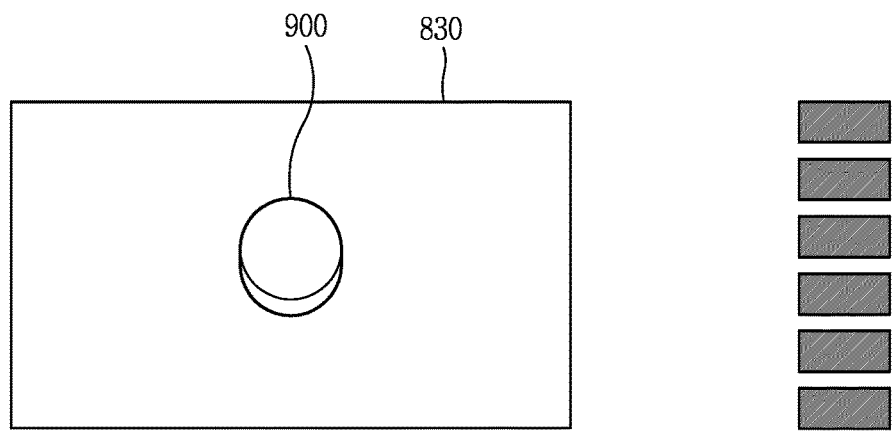
[MANUAL DRIVING MODE]   [MAGNETIC FORCE-SECOND STRENGTH]

FIG. 19B
(a)
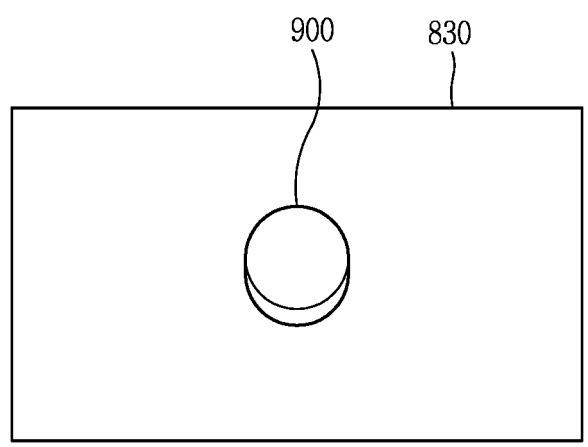
[MANUAL DRIVING MODE]  [MAGNETIC FORCE-MAXIMUM]
(b)
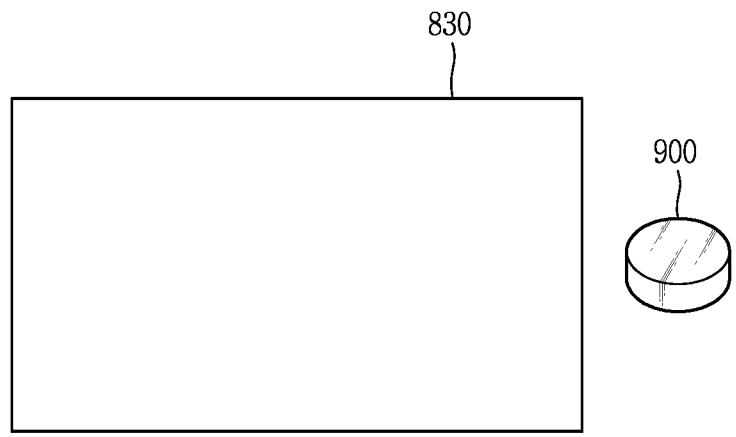
[MANUAL DRIVING MODE]  [MAGNETIC FORCE-ZERO]

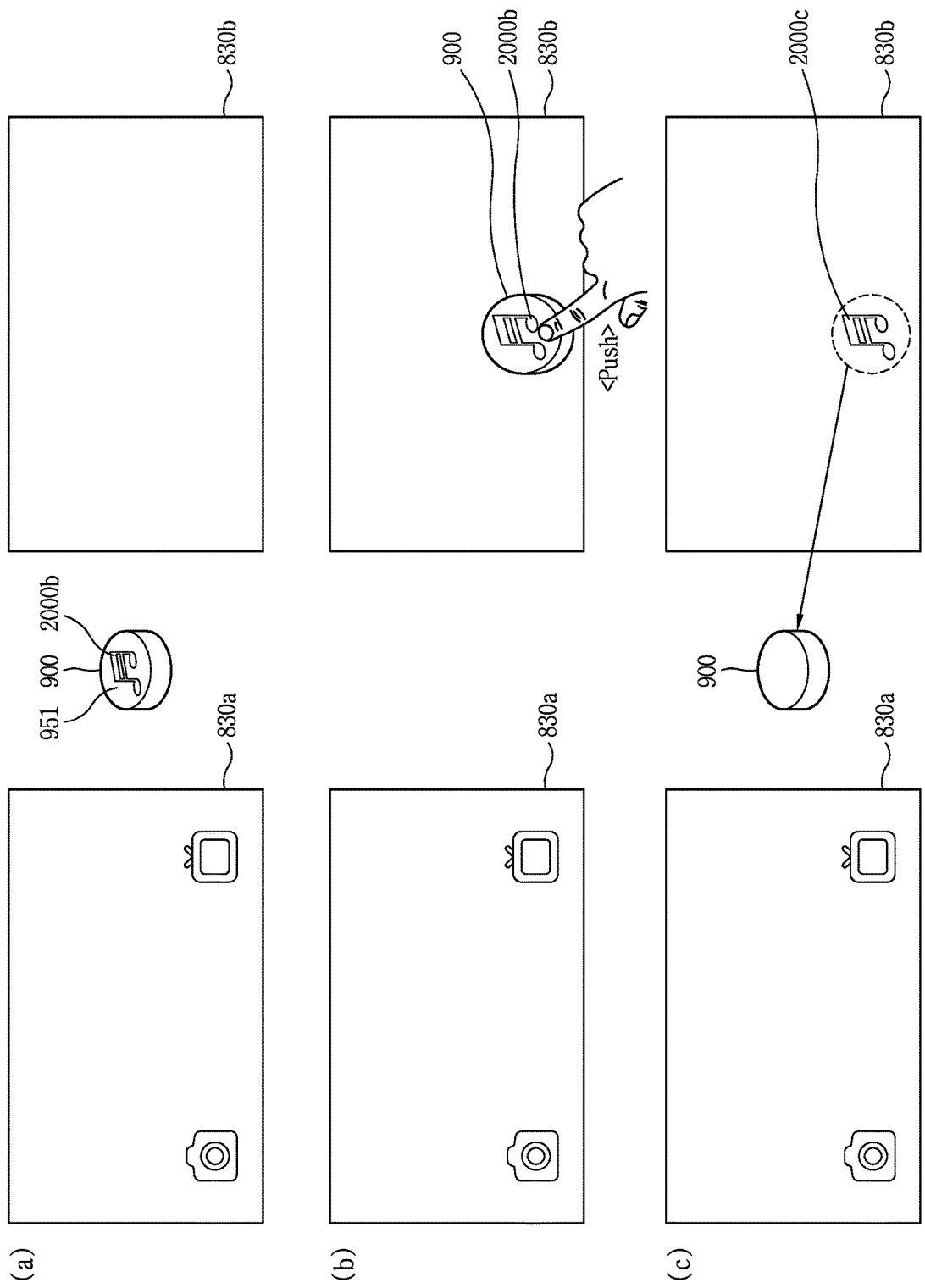

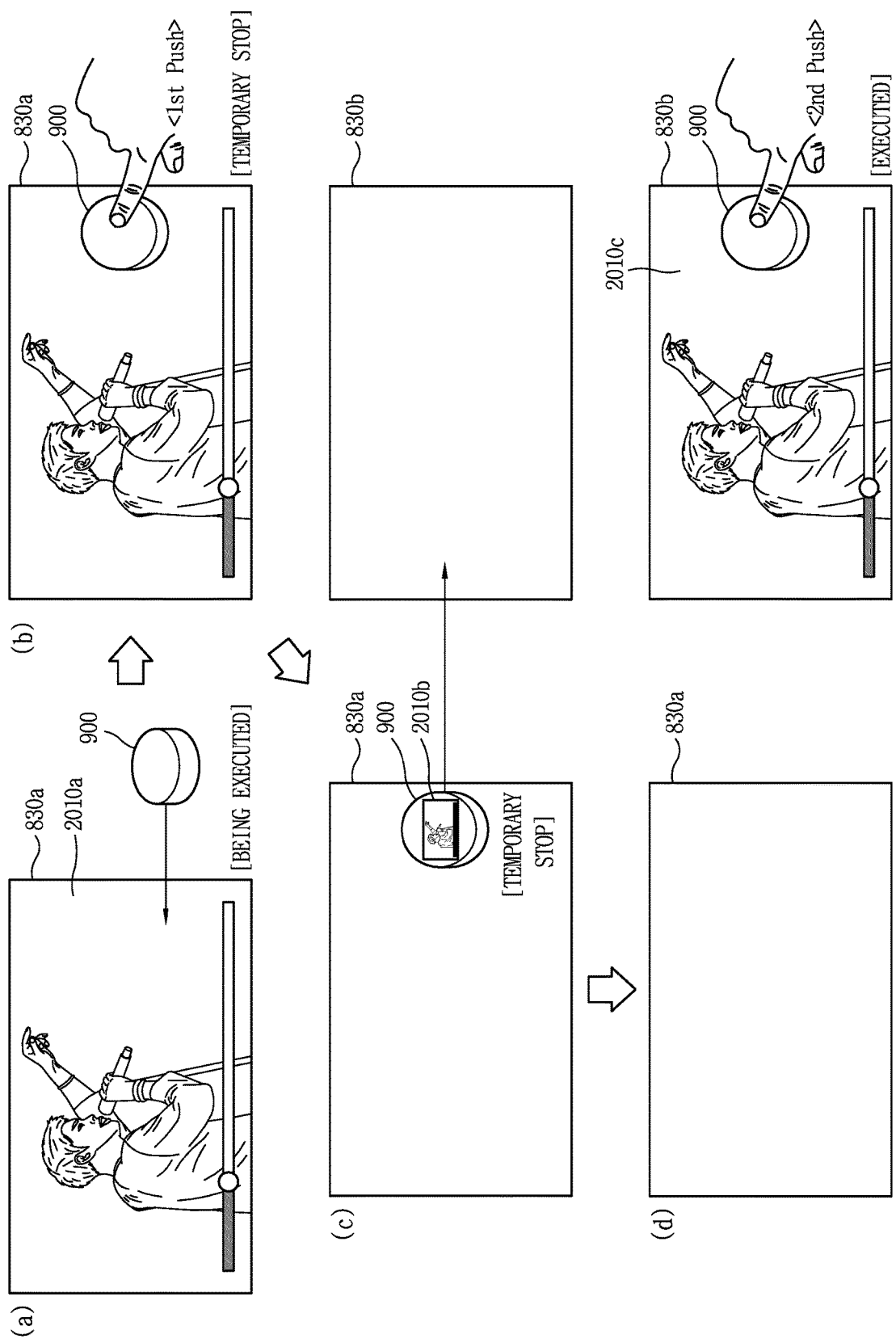

FIG. 22
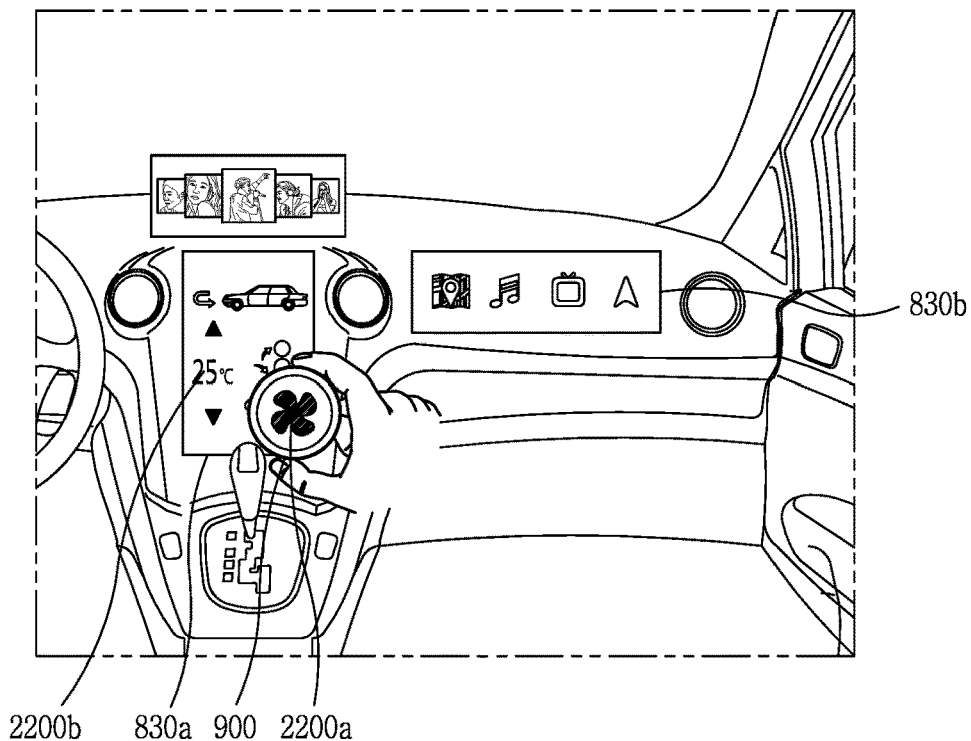
(a)
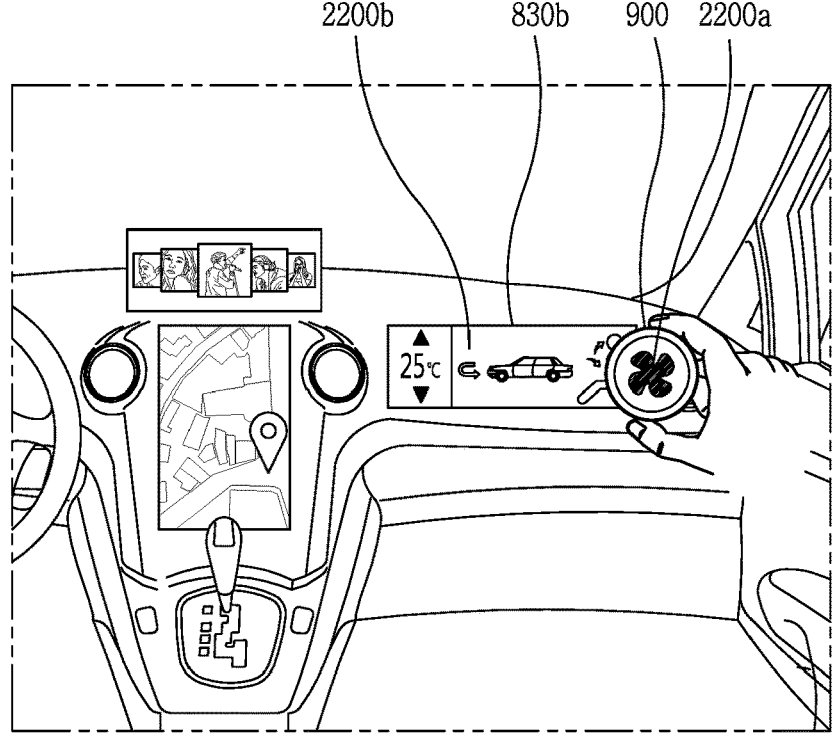
(b)

VEHICLE CONTROL DEVICE PROVIDED IN VEHICLE AND METHOD FOR CONTROLLING VEHICLE

CROSS-REFERENCE TO RELATED APPLICATION

Pursuant to 35 U.S.C. § 119(a), this application claims the benefit of an earlier filing date of and the right of priority to Korean Application No. 10-2017-0137559, filed on Oct. 23, 2017 and U.S. Provisional Application No. 62/430,893, filed on Dec. 6, 2016, the contents of which are incorporated by reference herein in its entirety.

TECHNICAL FIELD

The present disclosure relates to a vehicle control device provided in a vehicle and a method for controlling a vehicle.

BACKGROUND

A vehicle is an apparatus allowing a user who gets therein to move in a desired direction. Such a vehicle may be typically an automobile, for example.

Meanwhile, for convenience of a user who uses a vehicle, various sensors and electronic devices are provided. In particular, for driving convenience of a user, research into an advanced driver assistance system (ADAS) has been actively conducted. In addition, autonomous vehicles have been actively developed.

Various types of lamps may be provided in a vehicle. In general, a vehicle has various vehicle lamps having a lighting function for allowing a driver to easily check or view an object positioned in the vicinity of the vehicle when driving at night and a signal function for informing another vehicle or a road user about a driving state of the own vehicle.

For example, a vehicle may have a device operated in a manner of directly emitting using a lamp such as a headlight irradiating light to a front side to allow a driver to secure a visual field, a brake light turned on when the driver steps on a brake, a turn signal used when turning to the right or turning to the left.

In another example, a reflector reflecting light allowing the own vehicle to be easily recognized from outside is installed on a front side or a rear side of the vehicle.

An installation reference or standard of the vehicle lamp are defined by regulations to allow each function to be sufficiently exhibited.

Recently, as advanced driving assist system (ADAS) has been actively developed, the necessity to develop a technique capable of maximizing user convenience and safety in driving a vehicle has emerged.

Also, a vehicle has various input devices for receiving a user input.

Also, a vehicle may have various types of display device. For example, a display device provided in a vehicle may include a dashboard at a driver's seat, a center information display (CID) of a dashboard, a rear seat entertainment (RSE) at a rear seat.

Recently, development of implementing various user interface/user experience (UI/UX) by utilizing a detachable interface device to and from a display device has been actively ongoing.

SUMMARY

Therefore, an aspect of the detailed description is to provide a vehicle control device including an optimized detachable interface device which can be attached to or separated from a display unit provided in a vehicle.

Another aspect of the detailed description is to provide a vehicle control device capable of controlling a display unit provided in a vehicle using a detachable interface device in an optimized manner, and a method for controlling a vehicle.

Another aspect of the detailed description is to provide a vehicle control device capable of controlling a plurality of display units provided in a vehicle through a detachable interface device in various manners, and a method for controlling a vehicle.

Technical subjects of the present invention that may be obtained in the present invention are not limited to the foregoing technical subjects and any other technical subjects not mentioned herein may be easily understood by a person skilled in the art from the present disclosure and accompanying drawings.

To achieve these and other advantages and in accordance with the purpose of this specification, as embodied and broadly described herein, a vehicle control device may include: a display unit; a detachable interface device detachably attached to the display unit; and a processor controlling at least one of the display unit and the detachable interface device according to a preset scheme when the detachable interface device is attached to or detached from the display unit.

The detachable interface device may include: a display module displaying screen information displayed in one region of the display unit; and a rotary input module disposed on the edge of the display module and formed to be rotatable, wherein the one region of the display unit may be a region to which the detachable interface device is adhered to the display unit.

The display module may include a lens, and when the detachable interface device is adhered to the one region of the display unit, the screen information displayed in the one region may be magnified and output through the display module.

When the detachable interface device is adhered to the one region of the display unit, the processor may control the display unit such that the detachable interface device is moved, on the basis of a position of a graphic object displayed in the one region.

The processor may move the detachable interface device such that the graphic object is positioned at the center of the detachable interface device or such that the graphic object is entirely included in the detachable interface device.

The processor may control the display unit such that the detachable interface device is automatically moved in a state of being adhered to the display unit.

The display unit may include a plurality of electromagnets disposed on a rear surface of the display unit and varying a magnetic pole, the detachable interface device may have a magnet formed to have any one magnetic pole, and the processor may control a magnetic pole of the plurality of electromagnets such that the detachable interface device is automatically moved in a state of being adhered to the display unit.

When the detachable interface device is adhered to one region of the display unit and a portion of a graphic object is included in the one region, the processor may control the display unit such that the graphic object is entirely included in the one region.

When the detachable interface device is adhered to the one region of the display unit, the processor may control the display unit such that an output size of a graphic object is varied on the basis of a size of the one region.

The detachable interface device may include a touch sensor, and when the detachable interface device is adhered to the display unit, the processor may sense the number of fingers gripping the detachable interface device through the touch sensor and perform different functions according to the sensed number of fingers.

The display unit may include a plurality of electromagnets disposed on a rear surface of the display unit and varying strength of a magnetic force, the detachable interface device may have a magnet formed to have any one magnetic pole, and the processor may vary strength of the magnetic force on the basis of a driving mode of a vehicle.

When the driving mode of the vehicle is an autonomous driving mode, the processor may control the display unit such that the magnetic force has a first strength, and when the driving mode of the vehicle is a manual driving mode, the processor may control the display unit such that the magnetic force has second strength greater than the first strength.

When the detachable interface device is adhered to the display unit in a state in which the driving mode of the vehicle is the manual driving mode, the processor may adjust strength of the magnetic force to a maximum level, and when the detachable interface device is separated from the display unit in a state in which the driving mode of the vehicle is the manual driving mode, the processor may adjust strength of the magnetic force to a minimum level.

The display module may be a display module to which a push input may be applied, and when the detachable interface device is adhered to one region of the display unit, the processor may output second screen information corresponding to first screen information displayed in the one region, on the display module.

When a push input is applied to the display module in a state in which the second screen information is output on the display module, the processor may control the display unit such that the first screen information is not output any longer.

After the push input is applied, although the detachable interface device is separated from the display unit, outputting the second screen information on the display module may be maintained.

The display unit may include a plurality of displays, and when the detachable interface device including the display module displaying the second screen information is adhered to a second display different from a first display outputting the first screen information, the processor may output third screen information corresponding to the second screen information on the second display.

When a push input is applied to the display module in a state in which the display module is adhered to the second display, the detachable interface device may not output the second screen information any longer.

A function corresponding to the first screen information and a function corresponding to the third screen information may be the same functions, and when a first push input is applied to the display module in a state in which the detachable interface device is adhered to the first display, the processor may temporarily stop the executed function, and when a second push input is applied to the display module in a state in which the detachable interface device is adhered to the second display, the processor may resume executing the temporarily stopped function.

A vehicle according to an embodiment of the present disclosure may include a vehicle control device described in this disclosure.

Details of embodiments are included in detailed descriptions and drawings.

The embodiments of the present disclosure have the following advantages and effects.

First, the present disclosure may provide a detachable interface device which can be attached to or detached from the display unit and provide various UI/UX by using the detachable interface device.

Second, the present disclosure may provide a new detachable interface device which can be automatically moved according to a position to which the detachable interface device is adhered to the display unit.

Third, the present disclosure may provide the vehicle control device capable of changing screen information displayed on the display unit in an optimized manner by utilizing the detachable interface device, and the control method thereof.

Fourth, the present disclosure may provide a new vehicle interface system capable of utilizing a plurality of display units provided in a vehicle through the detachable interface device in an optimized manner.

Advantages and effects of the present invention that may be obtained in the present invention are not limited to the foregoing effects and any other technical effects not mentioned herein may be easily understood by a person skilled in the art from the present disclosure and accompanying drawings.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a view illustrating an appearance of a vehicle according to an embodiment of the present disclosure.

FIGS. 10A, 10B, 11, 12A, 12B, and 13 are conceptual views illustrating a structure of a detachable interface device according to an embodiment of the present disclosure.

FIGS. 15, 16A, 16B, 17A, 17B, 18, 19A, 19B, 20A, 20B, 20C, 21, 22, 23, and 24 are conceptual views illustrating a method for controlling a display unit and a detachable interface device according to an embodiment of the present disclosure.

DETAILED DESCRIPTION

Figure 2:
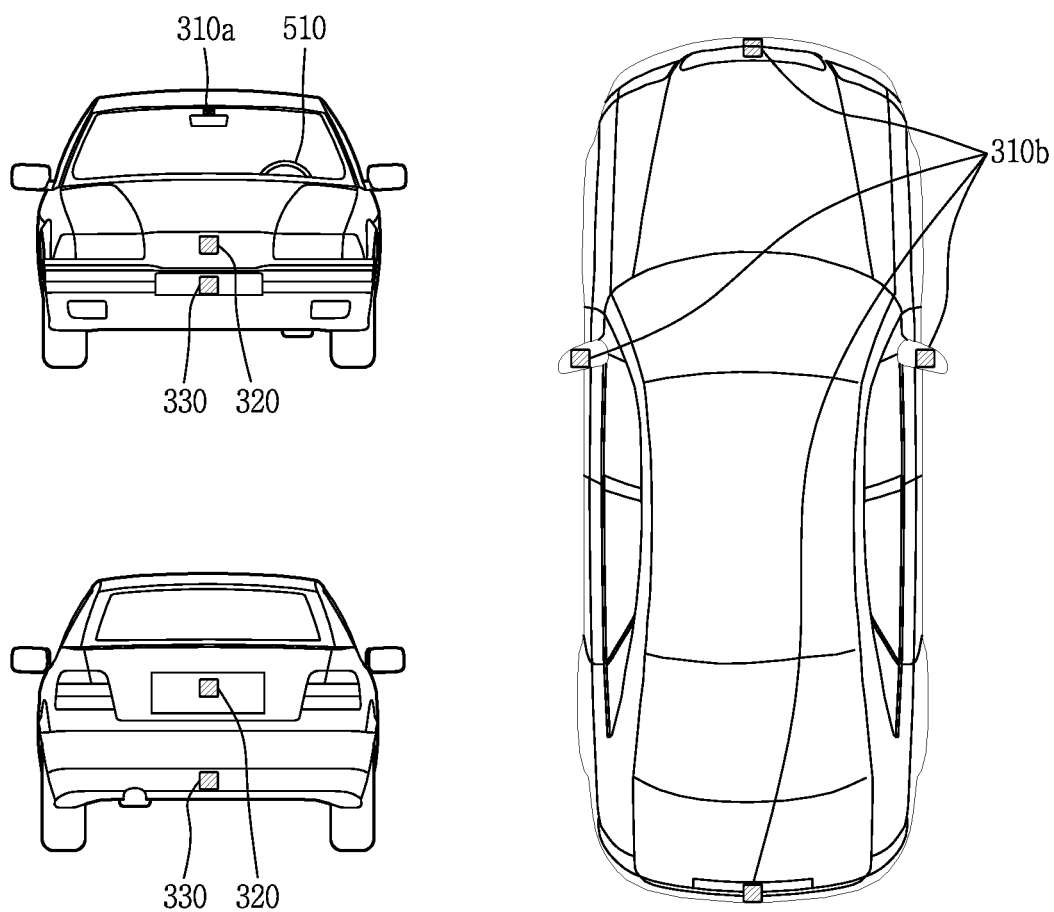
FIG. 2 is a view illustrating a vehicle according to an embodiment of the present disclosure viewed at various angles.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating appearance of a vehicle in accordance with an embodiment of the present invention.

FIG. 2 is a view illustrating appearance of a vehicle at various angles in accordance with an embodiment of the present invention.

Figure 3:
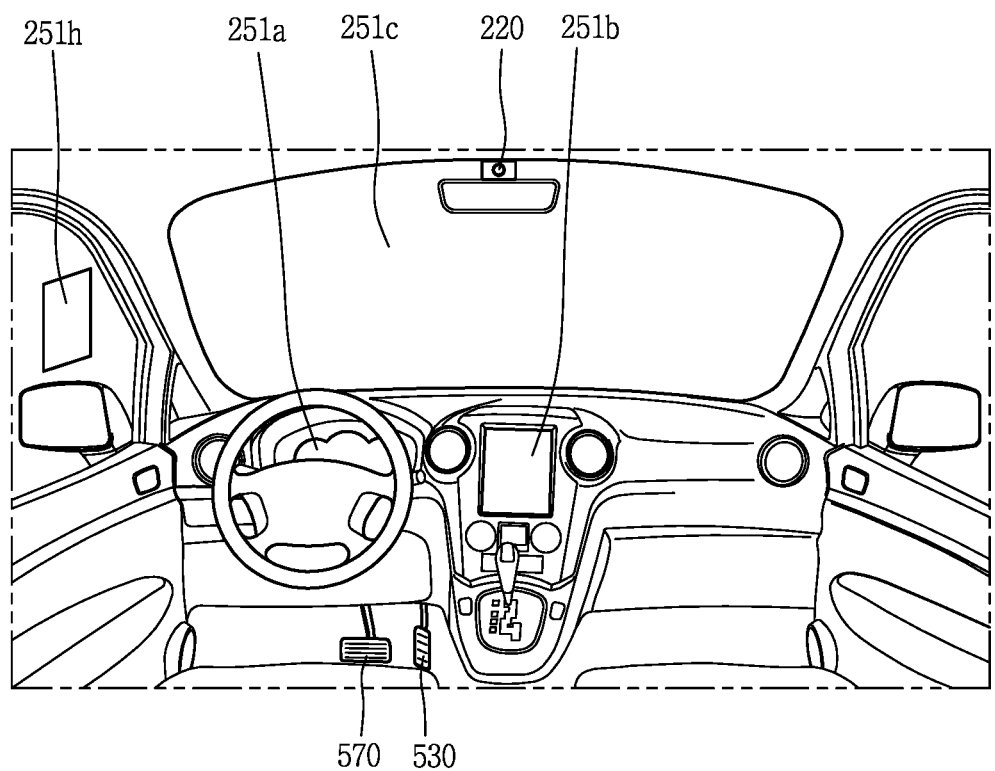
FIGS. 3 and 4 are views illustrating the inside of a vehicle according to an embodiment of the present disclosure.
Figure 4:
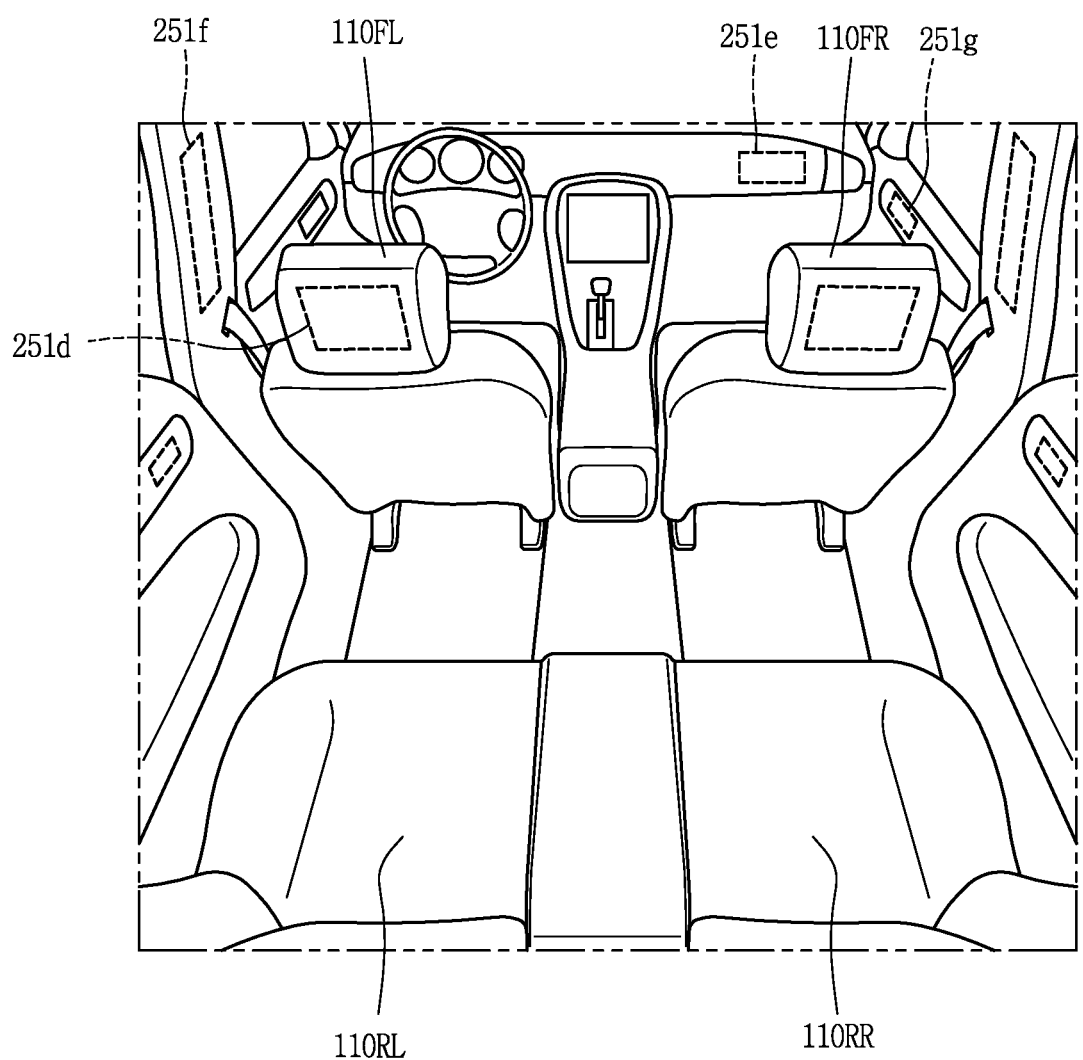

FIGS. 3 and 4 are views illustrating an inside of a vehicle in accordance with an embodiment of the present invention.

Figure 5:
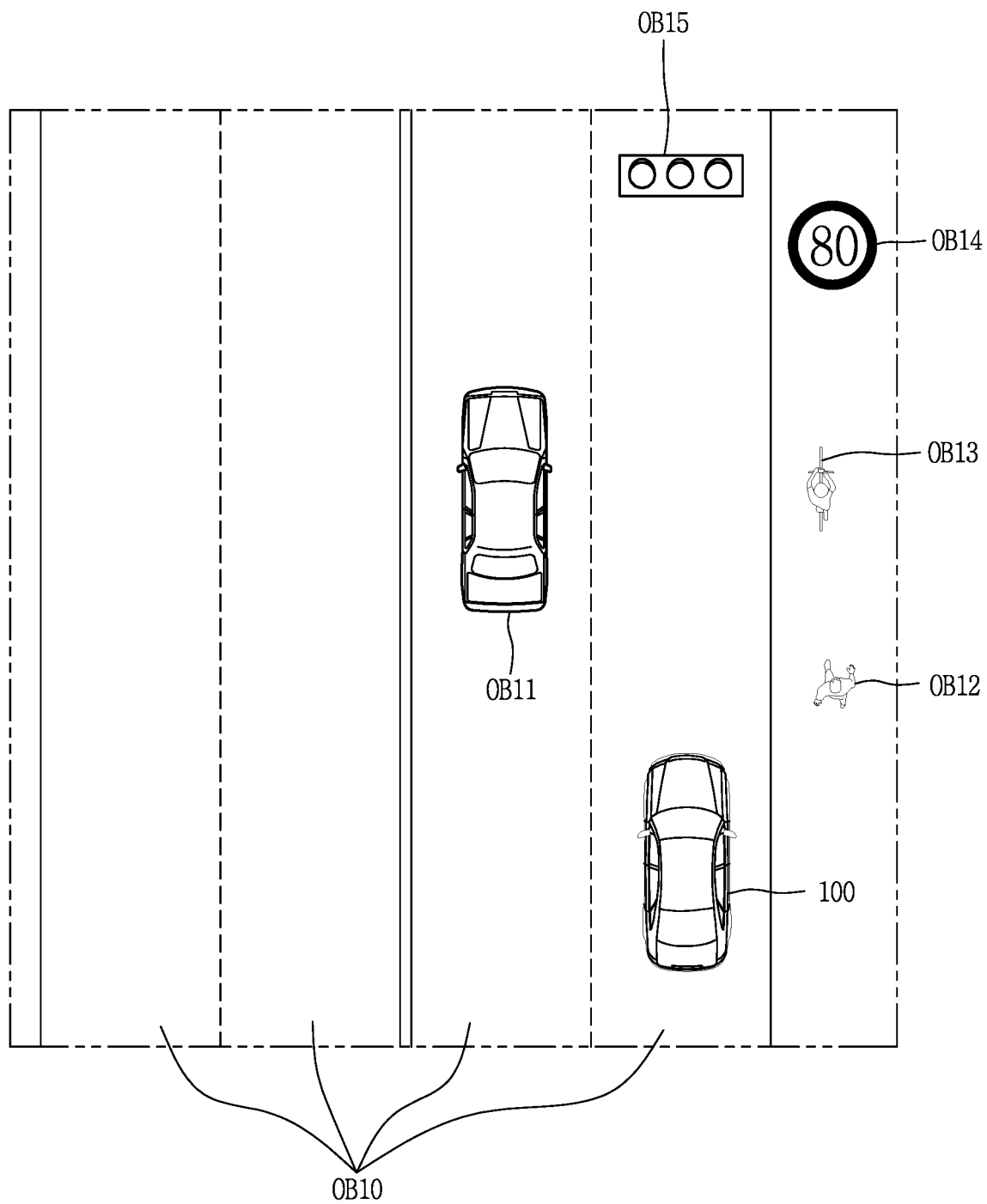
FIGS. 5 and 6 are views referred to in explaining an object according to an embodiment of the present disclosure.
Figure 6:
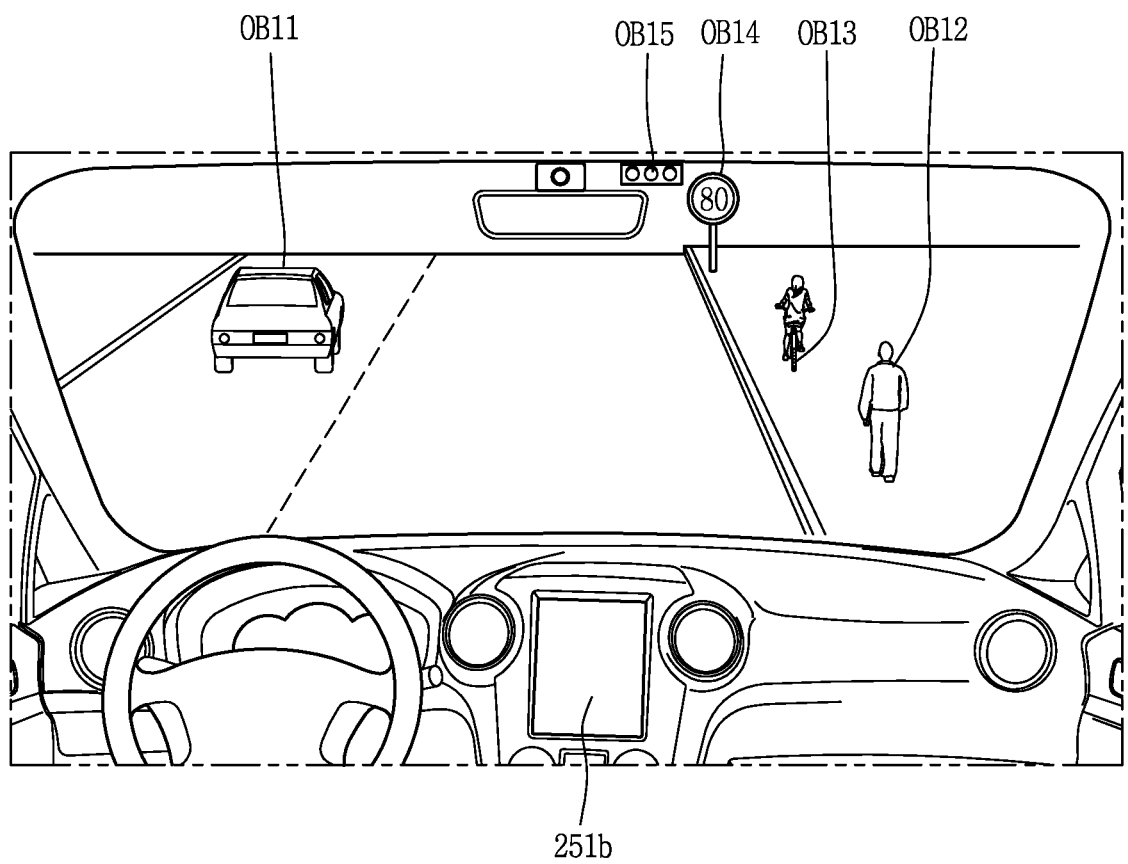

FIGS. 5 and 6 are reference views illustrating objects in accordance with an embodiment of the present invention.

Figure 7:
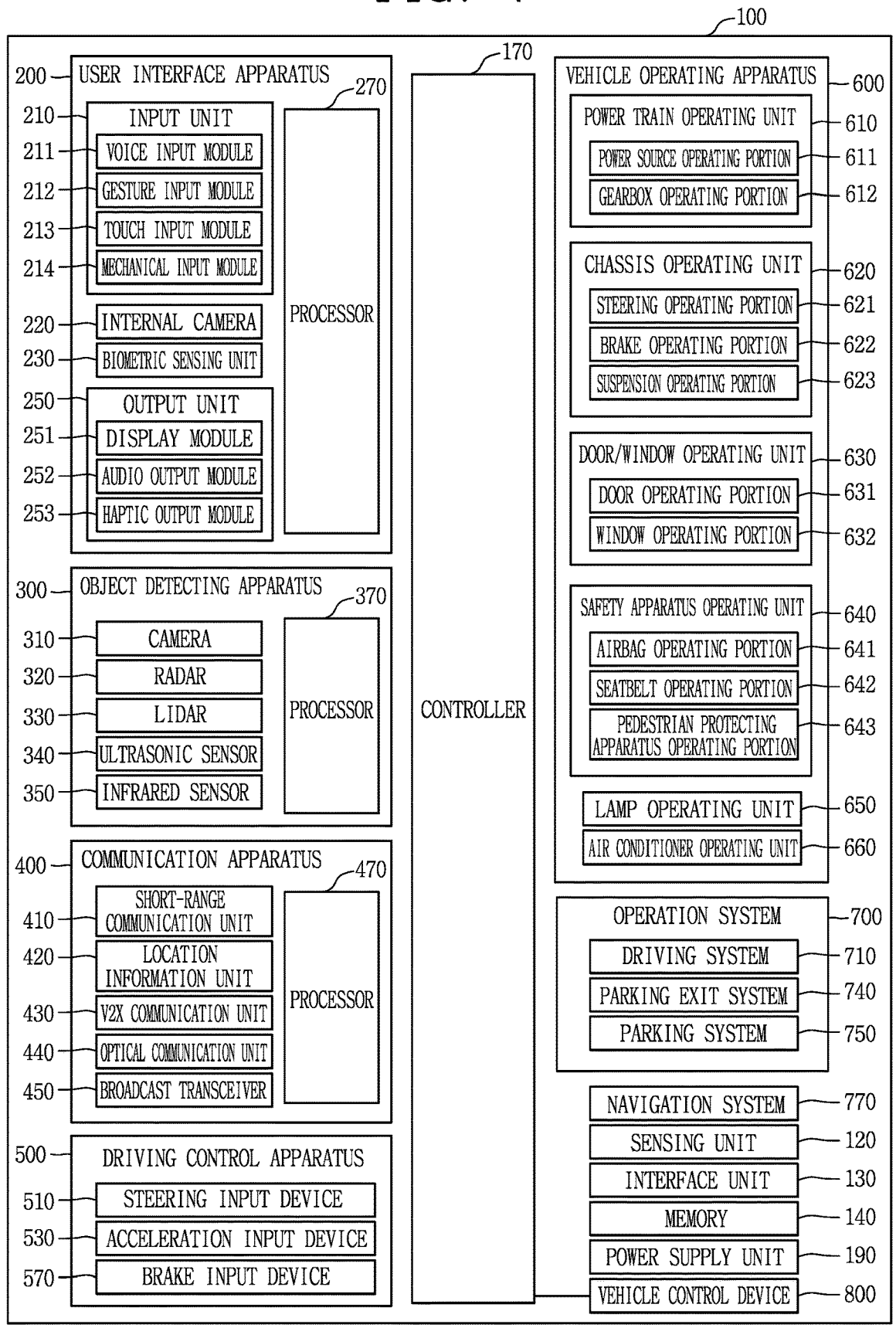
FIG. 7 is a block diagram referred to in explaining a vehicle according to an embodiment of the present disclosure.

FIG. 7 is a block diagram illustrating a vehicle in accordance with an embodiment of the present invention As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The user interface apparatus 200 may allow the user to input information. Data collected in the input unit 210 may be analyzed by the processor 270 and processed as a user's control command.

The input unit 210 may be disposed within the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The voice input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB10 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOF manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 350 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions or tasks.

Meanwhile, the vehicle 100 related to the present disclosure may include a vehicle control device 800.

The vehicle control device 800 may control at least one of the components described above with reference to FIG. 7. In this point of view, the vehicle control device 800 may be the controller 170.

However, without being limited thereto, the vehicle control device 800 may be a separate component independent from the controller 170. When the vehicle control device 800 is implemented as a component independent from the controller 170, the vehicle control device 800 may be provided in a portion of the vehicle 100.

Meanwhile, the vehicle control device 800 described in this disclosure may include any type of devices capable of controlling a vehicle, and may be a mobile terminal, for example. When the vehicle control device 800 is a mobile terminal, the mobile terminal and the vehicle 100 may be connected for communication wiredly or wirelessly. Also, the mobile terminal may control the vehicle 100 in various manner in a communication connected state.

When the vehicle control device 800 is a mobile terminal, a processor 870 described in this disclosure may be a controller of the mobile terminal.

Hereinafter, for the purposes of description, it is assumed that the vehicle control device 800 is a separate component independent from the controller 170. Functions (operations) and control method described with respect to the vehicle control device 800 may be performed by the controller 170 of a vehicle. That is, all contents described in relation to the vehicle control device 800 may also be inferred and applied to the controller 170 in the same or similar manner.

Also, the vehicle control device 800 described in this disclosure may include the components described above with reference to FIG. 7 and some of various components provided in the vehicle. In this disclosure, for the purposes of description, the components described above with reference to FIG. 7 and some of various components provided in the vehicle will be given separate names and reference numerals and described accordingly.

Hereinafter, components included in the vehicle control device 800 according to an embodiment of the present disclosure will be will be described in detail with reference to the accompanying drawings.

Figure 8:
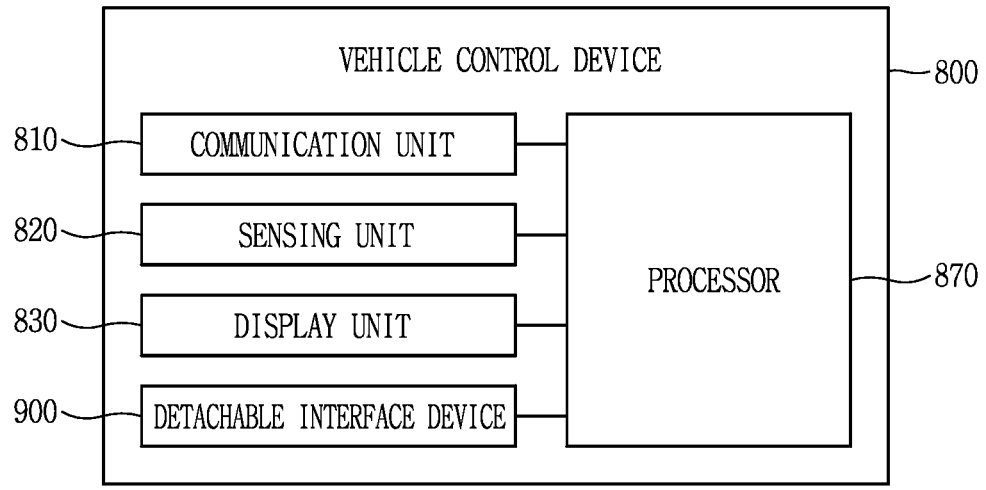
FIG. 8 is a block diagram illustrating a vehicle control device according to an embodiment of the present disclosure.

FIG. 8 is a block diagram illustrating a vehicle control device according to an embodiment of the present disclosure.

The vehicle control device 800 related to the present disclosure may include a communication unit 810, a sensing unit 820, a display unit 830, a detachable interface device 900, and a processor 870.

First, the vehicle control device 1800 related to the present disclosure may have a communication unit 810.

The communication unit 810 may be the aforementioned communication apparatus 400. The communication unit 810 may be connected to be available for communicating with a mobile terminal present within the vehicle 100.

For example, the vehicle control device 800 (or the vehicle 100) and the mobile terminal may be connected for wireless communication through the communication unit 810. The vehicle control device 800 and the mobile terminal may be wirelessly connected for mutual wireless communication according to a user request, or in case where the vehicle control device 800 and the mobile terminal have once been connected for wireless communication, when the mobile terminal enters the inside of the vehicle, the mobile terminal may be wirelessly connected to the vehicle control device 800 for mutual wireless communication.

The communication unit 810 may be provided within the vehicle (or within the vehicle control device) or may be provided as a separate module to communicate with (or to be electrically coupled to) a component of the vehicle.

The vehicle control device 800 may control the mobile terminal through the communication unit 810.

In detail, the vehicle control device 800 may transmit a control signal for controlling the mobile terminal to the mobile terminal through the communication unit 810. When the control signal is received, the mobile terminal 900 may perform a function/operation/control corresponding to the control signal.

Conversely, in the present disclosure, it may be possible for the mobile terminal to control the vehicle control device 800 (or the vehicle 100). In detail, the mobile terminal may transmit a control signal for controlling the vehicle to the vehicle control device 800. In response, the vehicle control device 800 may perform a function/operation/control corresponding to the control signal transmitted from the mobile terminal 900.

Meanwhile, the vehicle control device 800 may communicate with the detachable interface device 900 formed to be detachably attached to the display unit 830 through the communication unit 810.

For example, the vehicle control device 800 may perform wireless communication with the detachable interface device 900 through the communication unit 810.

In another example, when the detachable interface device 900 is separated from the display unit 830, the vehicle control device 800 may perform wireless communication with the detachable interface device 900, and when the detachable interface device 900 is attached to the display unit 830, the vehicle control device 800 may perform wired communication.

The detachable interface device 900 will be described in detail hereinafter.

Meanwhile, the vehicle control device 800 related to the present disclosure may include the sensing unit 820.

The sensing unit 820 may include at least one of the object detecting apparatus 300, the sensing unit 120 provided in the vehicle 100, and the internal camera 220 provided in the vehicle 100 described above with reference to FIG. 7. The sensing unit 820 may include any one of the object detecting apparatus 300, the sensing unit 120, and the internal camera 220 or formed as a combination of at least two or more thereof.

Also, the sensing unit 820 may be a separate sensing unit independent from the object detecting apparatus 300 provided in the vehicle 100, the sensing unit 120 provided in the vehicle 100, and the internal camera 220 provided in the vehicle 100. Although the sensing unit 820 is an independent sensing unit, the sensing unit 820 may include features of the sensing unit 120, the internal camera 220, or the object detecting apparatus 300 described above with reference to FIG. 7.

The sensing unit 820 may include the camera 310 described above with reference to FIG. 7.

The sensing unit 820 may be implemented by combining at least two of the camera 310, the radar 320, the LiDAR 330, the ultrasonic sensor 340, the infrared sensor 350, the sensing unit 120, the input unit 210 (or the voice input unit 211) included in the object detecting apparatus 300.

The sensing unit 820 may sense an object present around the vehicle 100 and sense information related to the object.

For example, the object may include a vehicle, a person, an object or geographical features nearby.

The sensing unit 820 may sense information related to the vehicle 100.

The information related to the vehicle may be at least one of vehicle information (or a driving state of the vehicle) and surrounding information of the vehicle.

For example, the vehicle information may include a driving speed of a vehicle, a weight of the vehicle, the number of occupants of the vehicle, braking power of the vehicle, maximum braking power of the vehicle, a driving mode of the vehicle (whether it is an autonomous driving mode or a manual driving mode), a parking mode of the vehicle (autonomous parking mode, automatic parking mode, or a manual parking mode), whether the user is present in the vehicle, a state of the user present within the vehicle, and information related to the user (e.g., whether the user is an authenticated user or not), and the like.

The surrounding information of the vehicle may include, for example, a state (frictional force, whether a pot hole is present, a type of road surface, etc.) of a road surface on which the vehicle is driving, weather, a distance to a preceding vehicle (or subsequent vehicle), a relative speed of a preceding vehicle (or a subsequent vehicle), position information of other vehicles, position information of an object, a bending rate of a curve when a lane in which the vehicle is driving is a curve, information related to an object present within a reference region (predetermined region) with respect to the vehicle, whether an object enters/leaves the predetermined region, whether a user is present in the vicinity of the vehicle, information related to the user (e.g., whether the user is an authenticated user or not), and the like.

Also, the surrounding information (or surrounding environmental information) of the vehicle may include external information of the vehicle (e.g., peripheral brightness, temperature, location of the sun, information of a peripheral subject (person, another vehicle, a sign, etc.), a type of a road surface on which the vehicle is driving, a geographic feature, line information, or lane information), and information required for autonomous driving/autonomous parking/automatic parking/manual parking mode.

Also, the surrounding information of the vehicle may further include a distance between an object present in the vicinity of the vehicle 100 and the vehicle 100, a type of the object, a parking space in which the vehicle may park, an object (e.g., a parking line, a string, another vehicle, a wall, etc.) for identifying the parking space, and the like.

Also, the information related to the vehicle may include information related to driving of the vehicle, whether an occupant is present beside the driver of the vehicle, information related to content output on the display unit, and the like.

The information related to driving of the vehicle may include a driving mode (general mode, sports mode, Eco mode, etc.), a speed of a vehicle, acceleration/deceleration of the vehicle, and the like.

Whether an occupant is present beside the driver of the vehicle may be determined through an image received through the internal camera 220 of the sensing unit 820 or may be determined by a driver status monitoring (DSM) system.

The sensing unit 820 may determine whether an occupant is present beside the driver of the vehicle using a sensor (e.g., pressure sensor, etc.) formed at a seat provided within the vehicle.

The information related to content output on the display unit may include a type of content (e.g., video, image, graphic object, web page, various types of information, etc.), an output form/output size/output ratio/of an execution screen of content when the content is output, information regarding whether the content is content associated to bend the display unit, and the like. The information related to content output on the display unit may be sensed by the sensing unit 820 or may be sensed (detected, determined, or extracted) by the processor 870.

Also, the sensing unit 820 related to the present disclosure may sense driver's eyes. The driver's eyes may be sensed (determined, extracted, or detected) on the basis of an image received through the internal camera included in the sensing unit 820.

The processor 870 may determine (extract, detect, or sense) a direction of the eyes of the driver who drives the vehicle, whether which of the plurality of regions of the display unit the driver gazes at, and the like, through the sensing unit 820.

Sensing driver's eyes using the sensing unit (camera) is a general technique, and thus, descriptions of a detail algorithm thereof will be omitted.

Meanwhile, the sensing unit 820 may sense whether the detachable interface device 900 is attached to (or mounted on, adhered to, inserted into, connected to, or comes into contact with) the display unit 830, whether the detachable interface device 900 is separated (or released) from the display unit 830, a position of the display unit 830 to which the detachable interface device 900 is attached, a region of the display unit 830 to which the detachable interface device 900 is attached, or a type of display unit to and from which the detachable interface device 900 is attached or detached when a plurality of display units 830 are present.

For example, the detachable interface device 900 may have a capacitor with capacitance. Also, the display unit 830 may have a sensor capable of sensing a change in capacitance. The sensor may be included in the sensing unit 820.

The sensor provided in the display unit 830 may sense a change in capacitance when the detachable interface device 900 approaches, becomes away, is attached, or is separated.

Also, the display unit 830 may have a sensor sensing a change in magnetic force. The sensor may be included in the sensing unit 820.

For example, a plurality of electromagnets capable of varying a magnetic pole (N pole or S pole) and varying strength of a magnetic force may be provided on a rear side of the display unit 830. Also, the detachable interface device 900 may have a magnet having any one magnetic pole or an electromagnet capable of varying strength of a magnetic pole/magnetic force.

The processor 870 may determine (sense, detect, or extract) whether the detachable interface device 900 approaches, becomes away, is attached to, or is detached from the display unit 830 through a sensor sensing a change in magnetic force.

Besides, the sensing unit 820 may sense whether the detachable interface device 900 is attached to, is separated from, approaches, or becomes away from the display unit 830, and any technical method for sensing the same may be applied to the sensing unit of the present disclosure.

Hereinafter, for the purposes of description, an example in which the sensing unit 820 is additionally provided in the vehicle control device 800 will be described.

The display unit 830 included in the vehicle control device 800 related to the present disclosure is a display device provided in the vehicle 100, which may be the display unit 251 described above.

The display unit 830 may be the output unit 250 or the display unit 251 described above with reference to FIG. 7. Also, the display unit 830 may include a transparent display. The transparent display may be attached to a wind shield or a window.

The display unit 830 may be implemented on one area of a steering wheel, one area 251a, 251b, or 251e of an instrument panel, one area 251d of a seat, one area 251f of each pillar, one area 251g of a door, one area of a center console, one area of a headlining, one area of a sun visor, one area 251c of a wind shield, one area 251h of a window or the like.

For example, the display unit 830 may include a cluster, a CID, a navigation device, and a head-up display (HUD).

The processor may output information related to various vehicles on the display unit 830. Also, the processor 870 may output information related to the vehicle at different positions of the display unit 830 according to types of the information related to the vehicle.

The display unit 830 of the present disclosure may be provided in a region of the instrument panel (or dashboard) described above and output (provide) content to the driver and/or the occupant.

Also, the display unit 830 may include a single display by incorporating a cluster and a CID, or may mean only the cluster.

The display unit 830 may include a plurality of regions formed to output information. Various types of information may be output on the plurality of regions, respectively.

The plurality of regions may be divided when the display unit is manufactured, or may be divided by output information (content, image, video, graphic object, text, etc.)

Also, the plurality of regions may be determined or varied by the processor 870 or according to a user setting.

Also, the vehicle control device 800 of the present disclosure may include the processor 870 capable of controlling the communication unit 810, the sensing unit 820, the display unit 830, the detachable interface device 900, and the like.

The processor 870 may be the controller 170 described above with reference to FIG. 7.

The processor 870 may control the components described above with reference to FIG. 7 and the components described above with reference to FIG. 8.

The processor 870 may be connected to the detachable interface device 900 through the communication unit 810 to communicate with the detachable interface device 900. Also, the processor 870 may control the detachable interface device 900 connected for communication through the communication unit 810.

The detachable interface device 900 may be detachably attached to the display unit 830. For example, the detachable interface device 900 may be detached from the display unit 830 or attached to the display unit 830 according to a user operation.

Here, the display unit 830 and the detachable interface device 900 may be easily attached or detached using an adhesive (adhesive film) or magnetic force, rather than be artificially attached through a forcible user operation.

On the basis of attaching or detaching the detachable interface device 900 to or from the display unit 830, the processor 870 may control at least one of the display unit 830 and the detachable interface device 900 in a preset manner.

Here, on the basis of attaching or detaching the detachable interface device 900 to or from the display unit 830, the processor 870 may control only the display unit 830, control only the detachable interface device 900, or control both the display unit 830 and the detachable interface device 900.

Hereinafter, the detachable interface device 900 detachably attached to the display unit 830 will be described with reference to the accompanying drawings.

Figure 9:
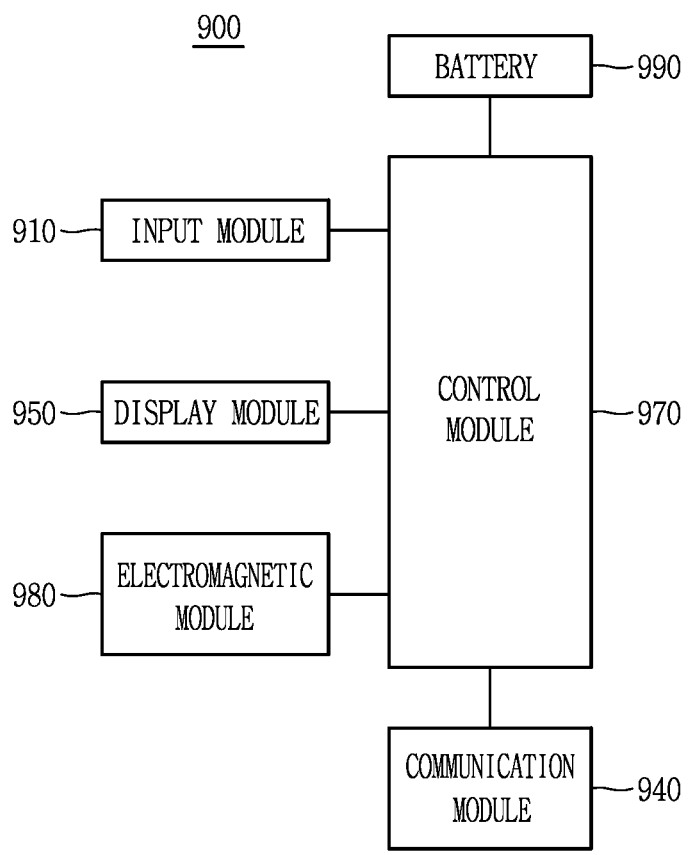
FIG. 9 is a block diagram illustrating a detachable interface device according to an embodiment of the present disclosure.

FIG. 9 is a block diagram illustrating a detachable interface device according to an embodiment of the present disclosure, and FIGS. 10, 11, 12A, 12B, and 13 are conceptual views illustrating a structure of a detachable interface device according to an embodiment of the present disclosure.

Examples of the detachable interface device 900 include a detachable interface module, a jog dial, a knob, and the like. In some implementations, the detachable interface device 900 can detect touch input received through at least one of the display unit 151 and the display module 950. In some other implementations, the detachable interface device 900 can detect rotational movement of at least one portion of the detachable interface device 900. For example, the detachable interface device 900 can include a conductive rod. When touch input is applied to the conductive rod, the detachable interface device 900 can detect the touch input using the conductive rod. In addition, when the conductive rod is rotated, the detachable interface device 900 can detect the rotational movement of the conductive rod.

The detachable interface device 900 may be attached to a region of at least one display unit 251 provided in the vehicle 100.

The detachable interface device 900 may have an electromagnetic module 980 on a rear surface thereof. Here, the rear surface of the detachable interface device 900 may refer to a surface attached to the display unit 830.

A plurality of display units 830 and 251 provided in the vehicle 100 may each have an electromagnet on a rear surface of a display panel.

The processor 870 (or the processor 270 of the user interface device 200) may control the electromagnetic module 980 (or electromagnet or magnet) of the detachable interface device 900 or magnetic force (or magnetic pole) of the electromagnet provided in the display unit 830.

The processor 870 may control at least one of a magnetic pole of the electromagnetic module 980 and a magnetic pole of the electromagnet provided in the display unit 830 such that attraction may act between the electromagnetic module 980 of the detachable interface device 900 and the electromagnet provided in the display unit 830.

For example, in case where a magnetic pole of the electromagnetic module 980 of the detachable interface device 900 is the N pole, a magnetic pole of the electromagnet of the display unit 830 may be an S pole such that the detachable interface device 900 may be attached to the display unit 830.

When attraction acts between the electromagnetic module 980 of the detachable interface device 900 and the electromagnet (or magnet) provided in the display unit 830, the detachable interface device 900 may be attached to the display unit 830.

According to a first embodiment, the detachable interface device 900 may be attached to the CID 251B.

Also, the detachable interface device 900 may be attached to one of the dashboard 251*a*, the RSE 251D, the passenger seat display 251*e*, and a side mirror display 251*s*.

The aforementioned displays may be included in the display unit 830 of the vehicle control device 800.

According to a second embodiment, the detachable interface device 900 may be separated from the display unit 830.

The detachable interface device 900 may be wirelessly connected to the communication unit 810 (or user interface device 200) to communicate with the communication unit 810.

According to a third embodiment, when the detachable interface device 900 is separated from the display unit 830, a menu (hereinafter, referred to as a "remote control menu") for controlling one or more devices provided in the vehicle 100 may be output to the detachable interface device 900.

The processor 870 (or the processor 270 of the user interface device 200) may determine whether the detachable interface device 900 is separated from the display unit 830.

When it is determined that the detachable interface device 900 is separated from the display unit 830, the processor 870 may transmit a control signal to the detachable interface device 900 such that the remote control menu may be output on the detachable interface device 900.

The processor 870 may transmit (provide) a control signal to the detachable interface device 900 through the communication unit 810 (or communication device 400).

A control module 970 of the detachable interface device 900 may output the remote control menu on a display module 950 on the basis of the control signal received through a communication module 940.

The control module 970 may transmit a user input received through the remote control menu displayed on the display module 950 to the vehicle control device 800 (or the user interface device 200).

the vehicle control device 800 may control one or more devices provided in the vehicle 100 on the basis of a user input received from the detachable interface device 900. Accordingly, the user may control the vehicle 100 using the separated detachable interface device 900.

When the detachable interface device 900 is attached to the display unit 830, the processor 870 may determine a type of the display unit 830 to which the detachable interface device 900 is attached. For example, a type of the display unit 830 may be the dashboard 251*a*, the CID 251B, the RSE 251D, the passenger seat display 251*e*, the side mirror display 251*s*, and the like.

Also, the detachable interface device 900 may include an input module 910, a display module 950, the electromagnetic module 980, the communication module 940, a battery 990, and the control module 970 for controlling these components.

The input module 910 may include a rotary input module formed to be rotatably and a display module 950 for receiving a push input. In some implementations, the rotary input module can include a conductive unit, e.g., a conductive rod, and a rotary detection unit. When the rotary input module receives user input, e.g., physical user input rotating the rotary input module, the conductive unit rotates in response to the user input. The rotary detection unit can detect the rotational movement of the conductive unit.

Based on the rotational movement of the conductive unit, the detachable interface device 900 can control which information is displayed on the display module of the detachable interface device 900. For example, the detachable interface device 900 can provide screen information that is displayed on a region of the display unit 830 to the display module for display. In particular, the region of the display unit 830 can be the region of the display unit 830 to which the detachable interface device 900 is coupled or a region that is adjacent to the region of the display unit 830 to which the detachable interface device 900 is coupled.

In some implementations, the detachable interface device 900 can move the information displayed on a first portion of the display module to a second portion of the display module based on the rotational movement of the conductive unit that is caused by the user input.

In some other implementations, the detachable interface device 900 can change the information displayed on the display module based on the rotational movement of the conductive unit that is caused by the user input. For example, when the detachable interface device 900 receives user input rotating the detachable interface device 900, the detachable interface device 900 can change the information displayed on the display module from a graphical object representing a music application to a graphical object representing a navigation application. As another example, when the detachable interface device 900 receives user input rotating the detachable interface device 900, the detachable interface device 900 can change a size of a graphical object that is displayed on the display module.

The input module 910 and the display module 950 may be integrally formed to display information, while receiving a push input. In some implementations, the display module 950 detects push input from a user. For example, when a user pushes the display module 950, the display module 950 detects the pressure from the user input. As another example, the display module 950 can detect capacitance between a user and the display module 950. However, the display module 950 can detect user input using any suitable techniques and not limited to the techniques described above. In some other implementations, the display unit 830 rather than the display module 950 can detect user input using any suitable techniques as described above.

Also, the display module 950 may be referred to as a push button or a push input module in that the display module 950 receives the push input.

That is, the input module 910 may be formed to receive a rotational input and a push input (or touch input).

Also, the display module 950 may have a touch sensor formed to receive a touch input.

The display module 950 may include a lens or a display module.

In case where the display module 950 is formed as a lens, at least one of the battery 990, the communication module 940, and the control module 970 may not include the detachable interface device 900 (or the detachable interface device 900 may be omitted).

In case where the display module 950 is formed as a display module, the battery 990, the communication module 940, and the control module 970 may be included in the detachable interface device 900, and the display module may be integrally formed with a touch sensor.

The detachable interface device 900 may include at least one electromagnet capable of varying a magnetic pole or strength of magnetic force by the processor 870 of the vehicle control device 800 or the control module 970. The at least one electromagnet may be provided on a rear surface of the detachable interface device 900 (surface which comes into contact with the display unit), but the present disclosure is not limited thereto.

The at least one electromagnet may be termed an electromagnetic module 980.

Meanwhile, when the electromagnet and the electromagnetic module 980 are separately provided, the electromagnetic module 980 may be formed to change a magnetic pole of the electromagnet or change strength of magnetic force.

Hereinafter, a structure of the detachable interface device 900 according to an embodiment of the present disclosure will be described with reference to the accompanying drawings.

Referring to (a) of FIG. 10A, in the vehicle 100 of the present disclosure, the display unit 830 and a detachable interface device 900 formed to be attached to or detached from the display unit 830 may be provided.

Referring to (b) of FIG. 10A, the detachable interface device 900 according to an embodiment of the present disclosure may include a circular encoder 902, a lens 901 formed to be inserted into the encoder 902, and a rotary knob 903 coupled to the outside of the encoder 902.

The encoder 902 may serve as a main body of the detachable interface device 900. The lens 901 may be inserted into the center of the encoder 902.

Also, the knob 903 may be coupled to an outer surface of the encoder 902. The knob 903 may be coupled to the encoder 902 such that the knob 903 is rotated without a limitation or such that the knob 903 is rotated only at a predetermined angle.

When a push (or pressure) is applied to the lens 901, the encoder 902 may receive the push as a push input. Here, the encoder 902 may be formed to feed back that the lens 901 has been pushed. The lens 901 may be an example of the display module 950.

Also, when the knob 903 is rotated by the user, the encoder 902 feeds back a degree of rotation of the knob 903 to the user. The knob 903 may be a rotation input module in that it is disposed at an edge of the display module 950 and rotatable.

The processor 870 or the control module 970 may sense (detect, receive, or determine) that a push input is received by the display module 950 or that the rotary input module (knob 903) is rotated.

(c) of FIG. 10A is a cross-sectional view taken along line A-A of (a) of FIG. 10.

Referring to (c) of FIG. 10A, an adhesive film (e.g., an optically clear resin (OCR), or an optically clear adhesive (OCA)) may be provided on a rear surface of the detachable interface device 900. Here, the detachable interface device 900 may be attached to a region of the display unit 830.

Figure 10B:
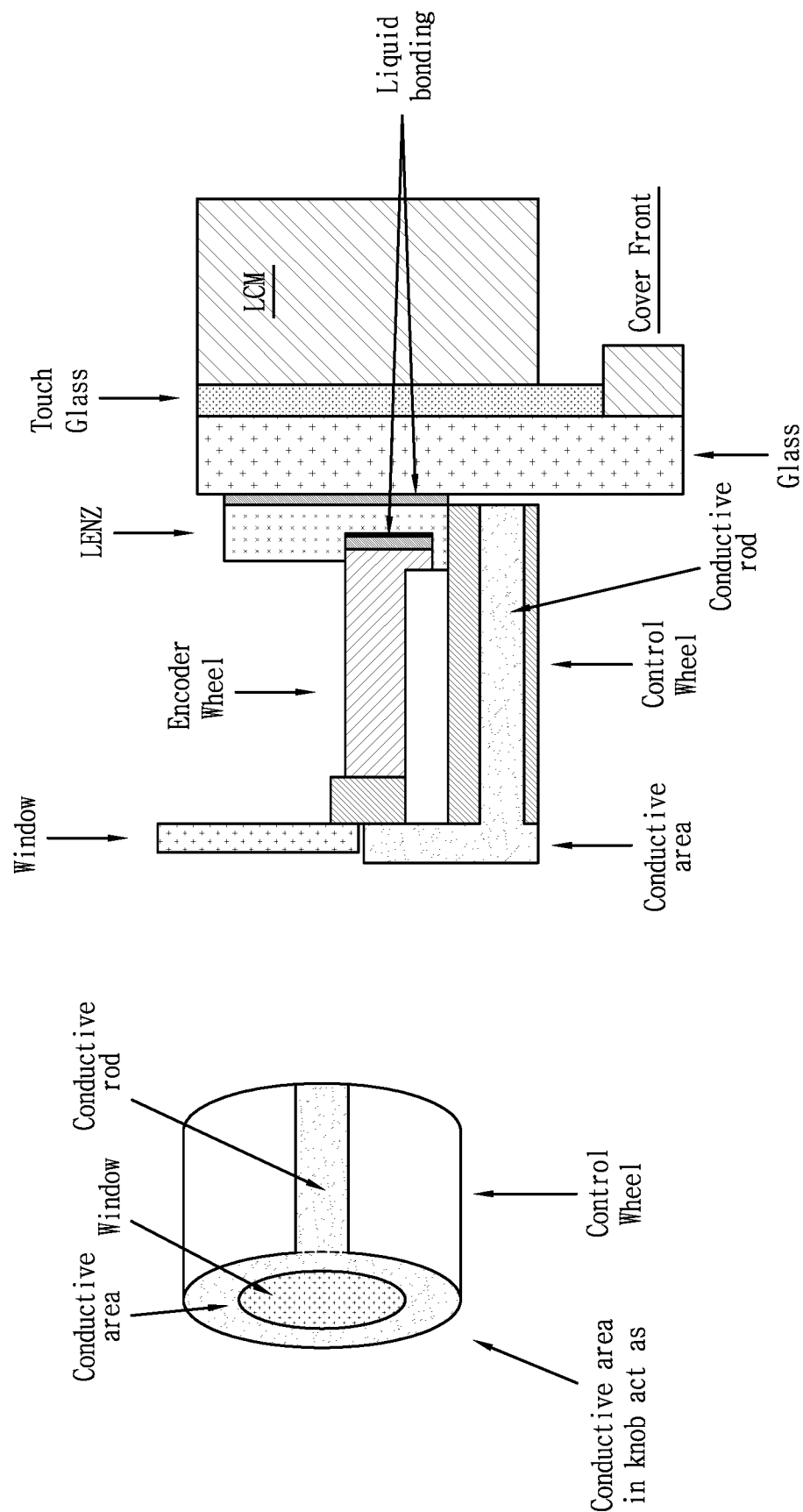

As illustrated in FIG. 10B, in some implementations, the rotary input module can include a conductive unit, e.g., a conductive rod, and a rotary detection unit. When the rotary input module receives user input, e.g., physical user input rotating the rotary input module, the conductive unit rotates in response to the user input. The rotary detection unit can detect the rotational movement of the conductive unit.

Based on the rotational movement of the conductive unit, the detachable interface device 900 can control which information is displayed on the display module of the detachable interface device 900. For example, the detachable interface device 900 can provide screen information that is displayed on a region of the display unit 830 to the display module for display. In particular, the region of the display unit 830 can be the region of the display unit 830 to which the detachable interface device 900 is coupled or a region that is adjacent to the region of the display unit 830 to which the detachable interface device 900 is coupled.

In some implementations, the detachable interface device 900 can move the information displayed on a first portion of the display module to a second portion of the display module based on the rotational movement of the conductive unit that is caused by the user input.

Figure 11:
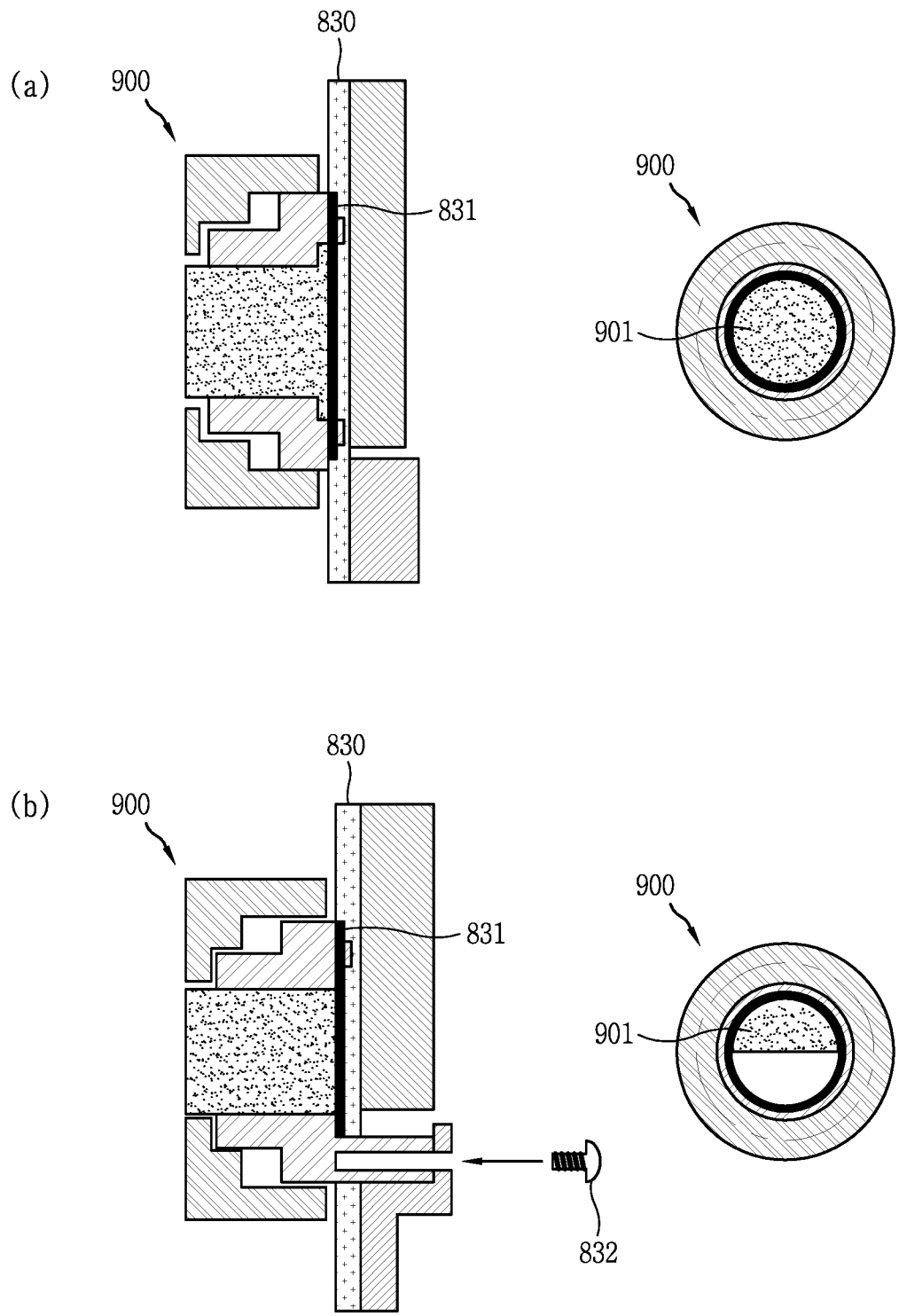

As illustrated in (a) of FIG. 11, the detachable interface device 900 may be selectively adhered to a partial region of all of regions of the display unit 830 using an adhesive film provided on a rear surface.

Meanwhile, as illustrated in (b) of FIG. 11, only a portion of the detachable interface device 900 of the present disclosure may be adhered to the display unit 830 and the other remaining portion may be adhered to a region outside the display unit 830. Here, as illustrated in (b) of FIG. 11, a fixing member (e.g., a screw) 832 may be connected to the detachable interface device 900 adhered to the region outside the display unit 830 to fix the detachable interface device 900 such that the detachable interface device 900 may not be separated.

As illustrated in (a) of FIG. 11, screen information output on the display unit 830 may be displayed on the display module (e.g., the lens 901) of the detachable interface device 900 formed to be detachably attached to the display unit 830.

As illustrated in (b) of FIG. 11, in case where only one portion of the detachable interface device 900 is adhered to the display unit 830 and the other remaining portion is outside the display unit 830, screen information output on the display unit 830 may be displayed only on the display module (e.g., the lens 901) corresponding to the one portion.

The detachable interface device 900 of the present disclosure may be formed to receive a push input or may be formed not to be able to receive a push input.

In case where the detachable interface device is formed to receive a push input, a size (or volume) of the detachable interface device 900 may be formed to be greater than the detachable interface device formed not to be able to receive a push input.

Figure 12A:
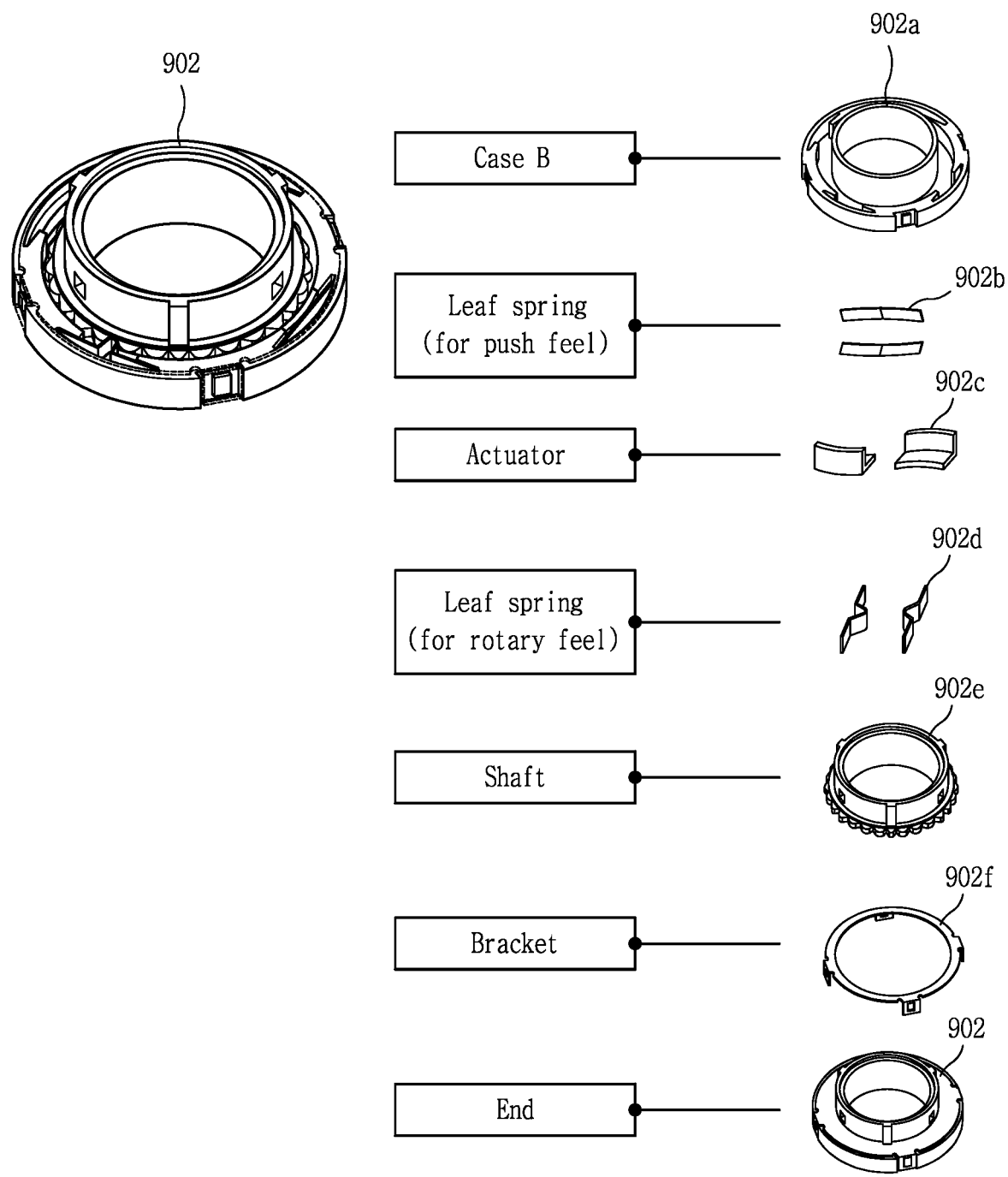

FIG. 12A is an exploded perspective view of the encoder 902 of the detachable interface device 900.

The encoder 902 may be formed by combining a case 902a, a first leaf spring 902b for feeding back a push input, an actuator 903c, a second leaf spring 902d for feeding back a rotational input, a shaft 902e, and a bracket.

In case where the detachable interface device 900 is formed not to be able to receive a push input, the first leaf spring 902b and the actuator 902c may not be included.

Figure 12B:
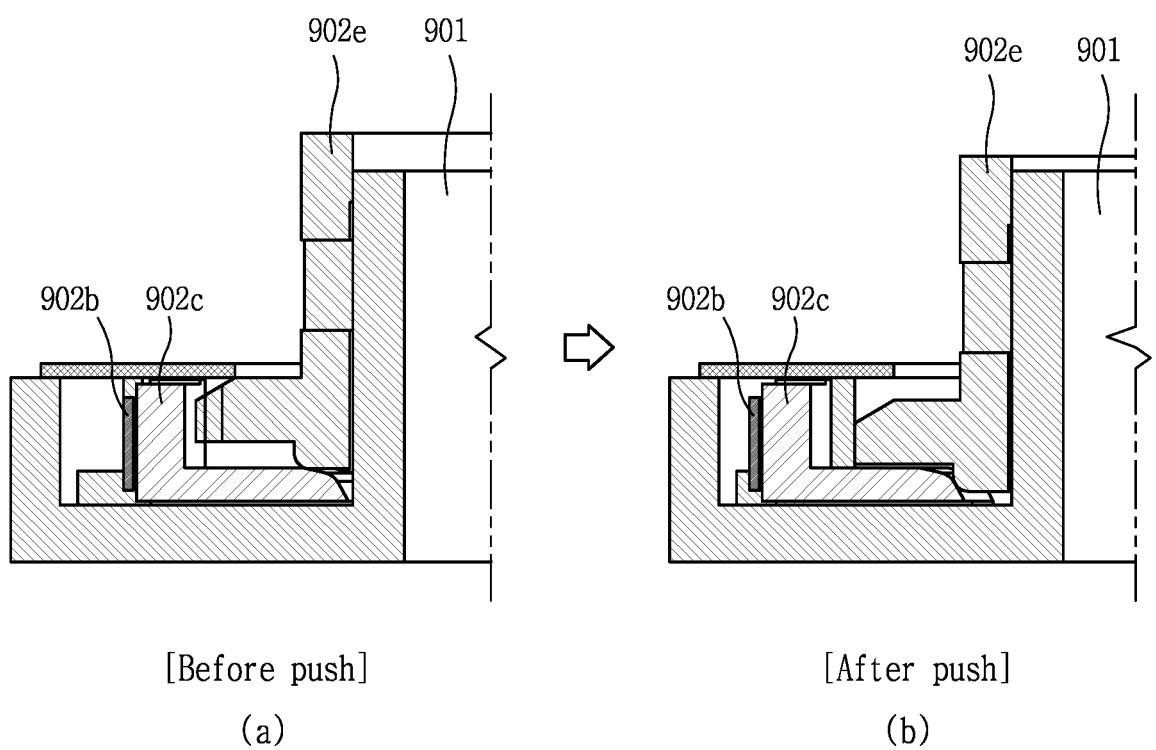

FIG. 12B illustrates a structure in which the detachable interface device 900 formed to receive a push input provides feedback of a push input.

Referring to (a) of FIG. 12B, the shaft 902e may be connected to a display module at an upper end and may be in contact with the actuator 902c at a lower end.

A portion where the actuator 902c and the shaft 902e are in contact may be rounded to mutually thrust in response to a push.

The first leaf spring 902b may be provided in a portion of the actuator.

As illustrated in (b) of FIG. 12B, when a push input is received by the display module, the shaft 902e connected to the push module may be moved in a pushed direction (e.g., a lower end direction).

Here, on the basis of pushing the shaft 902e, the actuator 902c may be moved in a direction perpendicular to the pushed direction.

Accordingly, the first leaf spring 902b connected to a portion of the actuator 902c is moved, and accordingly, feedback regarding the push input may be provided to the user.

The detachable interface device 900 may employ a structure of a jog dial or a knob provided on or near the display unit 830 of an existing vehicle. However, in the present disclosure, unlike the related art jog dial or knob, the detachable interface device 900 detachably attached to the display unit 830 may be provided.

Meanwhile, referring to (a) of FIG. 13, the display module 950 displayed on the detachable interface device 900 of the present disclosure may be the lens 901. In this case, in case where the detachable interface device 900 is adhered to the display unit 830, a portion of screen information being displayed on the display unit 830 may be displayed on and seen through on the lens 901 of the detachable interface device 900.

Here, in case where the lens 901 is a convex lens, information displayed in a region to which the detachable interface device 900 is adhered, in the screen information displayed on the display unit 830, may be magnified to be displayed.

Here, in case where the lens 901 is a concave lens, information displayed in a region to which the detachable interface device 900 is adhered, in the screen information displayed on the display unit 830, may be reduced to be displayed.

Also, as illustrated in (b) of FIG. 13, in a state in which the detachable interface device 900 is adhered to the display unit 830, when a side surface of the detachable interface device 900 is viewed, screen information being output on the display unit 830 may not be output on the side surface of the detachable interface device 900. This is because the rotary input module (or knob) is provided on the side surface of the detachable interface device 900.

Meanwhile, in case where the rotary input module is formed of a transparent material, screen information being output on the display unit 830 may also be displayed on the side surface of the detachable interface device 900.

Meanwhile, the detachable interface device 900 of the present disclosure may be adhered to the display unit 830 through magnetic force.

The plurality of display units 830 provided in the vehicle 100 may each include a display panel and a magnet.

The magnet may be an electromagnetic panel or a permanent magnet panel. The magnet may be disposed on a rear surface of the display panel. The magnet may be implemented in the form of a panel disposed on the rear surface of the display panel.

In case where the magnet is an electromagnetic panel, the processor 870 may control magnetic force of the electromagnetic panel. Here, controlling magnetic force of the electromagnetic panel may include determining/changing a magnetic pole (N pole or S pole), varying strength of magnetic force, and the like.

The detachable interface device 900 may have the electromagnetic module 980 or a magnet having any one magnetic pole on a rear surface thereof (surface in contact with the display unit).

The electromagnetic module 980 may be controlled by the processor 270 of the user interface device 200 or the control module 970 of the detachable interface device 900.

The electromagnetic module 980 may be an electromagnet having variable magnetic force. The magnetic force of the electromagnetic module 980 may be changed under the control of the processor 870 or the control module 970. Alternatively, the electromagnetic module 980 may be a permanent magnet having fixed magnetic force (or magnetic pole).

In case where magnetic force is generated in the electromagnetic module 980, attraction or repulsive force may be generated between a metal material or a material having magnetic force and the electromagnetic module 980.

In case where attraction acts between the magnetic disposed on the rear surface of the display panel and the electromagnetic module 980 of the detachable interface device 900, the detachable interface device 900 may be adhered to the front surface of the display panel (that is, adhered to the display unit 830).

The processor 870 may adjust magnetic force (or magnetic pole) of at least one of the electromagnetic panel and the electromagnetic module 980 such that attraction acts between the electromagnetic panel and the electromagnetic module 980 of the detachable interface device 900.

The processor 870 may adjust magnetic force (or magnetic pole) of the electromagnetic module 980 by providing a control signal to the detachable interface device 900.

The processor 870 may adjust magnetic force (or magnetic pole) of the electromagnet by providing a control signal to the electromagnetic panel.

Accordingly, the processor 870 may cause the detachable interface device 900 to be adhered to a region of the plurality of display units 830.

Unlike the drawings, a plurality of magnets may be disposed on the rear surface of the display panel.

Also, a magnet may be disposed in a region of the rear surface of the display panel. In this case, the detachable interface device 900 may be adhered only to the region of the rear surface where the magnet is disposed, in the entire region of the display panel.

Unlike the embodiment of the drawing, the electromagnetic module may be permanent magnet. The term of 'permanent magnet' may refer to a magnet having any one magnetic pole (N pole or S pole).

Figure 14:
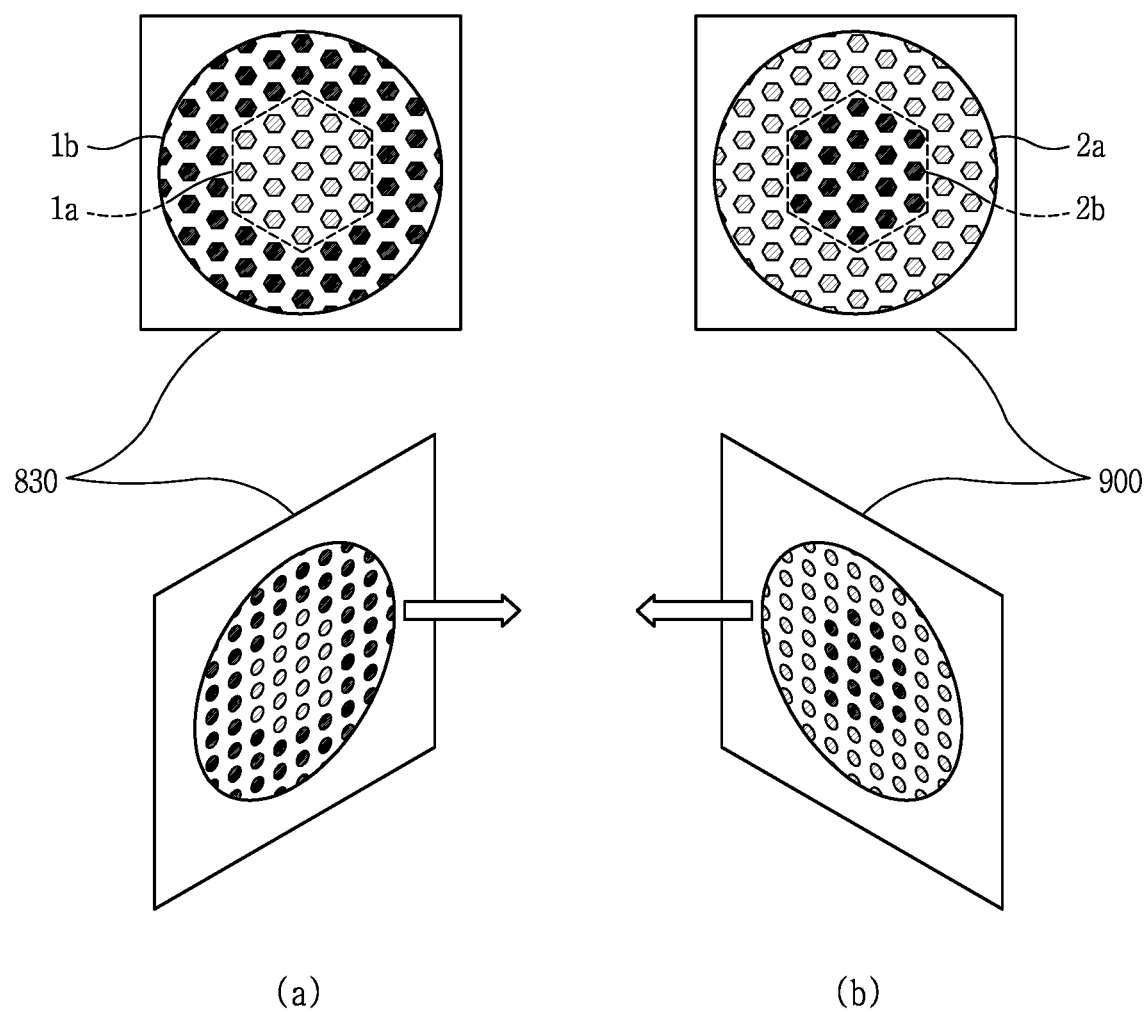
FIG. 14 is a conceptual view illustrating a method for attaching a detachable interface device according to another embodiment of the present disclosure to a display unit.

Referring to FIG. 14, the processor 870 (or the processor 270 of the user interface device 200) may form a plurality of magnetic pixels in the electromagnet provided in the display unit 830 and in the electromagnetic module 980 provided in the detachable interface device 900. In other words, A plurality of magnetic pixels may be formed in the electromagnets provided in the display unit 830 and in the electromagnetic module 980 provided in the detachable interface device 900.

The magnetic pixel is a magnetic pole formed in a region of the electromagnet or the electromagnetic module 980. One magnetic pixel may be an N pole or S pole.

For example, the processor 870 may control the magnet such that magnetic pixels of N pole are arranged in a first region 1a of the magnet provided in the display unit 830. The processor 870 may control the magnet such that magnetic pixels of S pole are arranged in a second region 1b of the magnet.

The processor 870 may control the electromagnetic module 980 such that magnetic pixels of S pole are arranged in a first region 2a of the electromagnetic module 980 corresponding to the first region 1a of the magnet provided in the display unit 830. The processor 870 may control the electromagnetic module 980 such that magnetic pixels of N pole are arranged in a second region 2b of the electromagnetic module 980 corresponding to the second region 1b of the magnet provided in the display unit 830.

Accordingly, attraction is generated between the first region 1a of the magnet provided in the display unit 830 and the first region 2a of the electromagnetic module 980, and also, attraction is generated between the second region 1b of the magnet provided in the display unit 830 and the second region 2b of the electromagnetic module 980, attraction is generated between the magnet provided in the display unit 830 and the electromagnetic module 980.

In the present disclosure, it is defined that magnetic pixels of different polarities correspond to each other.

The processor 830 may arrange magnetic pixels mutually corresponding to the magnet provided in the display unit 830 and the electromagnetic module 980 to generate attraction between the magnet provided in the display unit 830 and the electromagnetic module 980.

The processor 870 may adjust adhesion between the detachable interface device 900 and the display unit 830 by adjusting the number of mutually corresponding magnetic pixels. In this case, the number of mutually corresponding magnetic pixels is in proportion to adhesion between the detachable interface device 900 and the display unit 830.

Meanwhile, an optimized UI/UX may be provided by attaching the detachable interface device 900 to the display unit 830 or separating the detachable interface device 900 from the display unit 830.

Hereinafter, the vehicle control device 800 controlling the detachable interface device 900 detachably attached to the display unit 830 and the display unit 830 in an optimized manner will be described in detail with reference to the accompanying drawings.

FIGS. 15, 16A, 16B, 17A, 17B, 18, 19A, 19B, 20A, 20B, 20C, 21, 22, 23, and 24 are conceptual views illustrating a method for controlling a display unit and a detachable interface device according to an embodiment of the present disclosure.

First, when the detachable interface device 900 is attached to or detached from the display unit 830, the processor 870 included in the vehicle control device 800 may control at least one of the display unit 830 or the detachable interface device 900 according to a preset scheme.

Here, the preset scheme may include a scheme of controlling the detachable interface device 900 and a scheme of controlling the display unit 830 on the basis of separation or connection between the detachable interface device 900 and the display unit 830, and may also include various other schemes.

Hereinafter, examples of the preset scheme will be described in detail with reference to the accompanying drawings.

Figure 15:
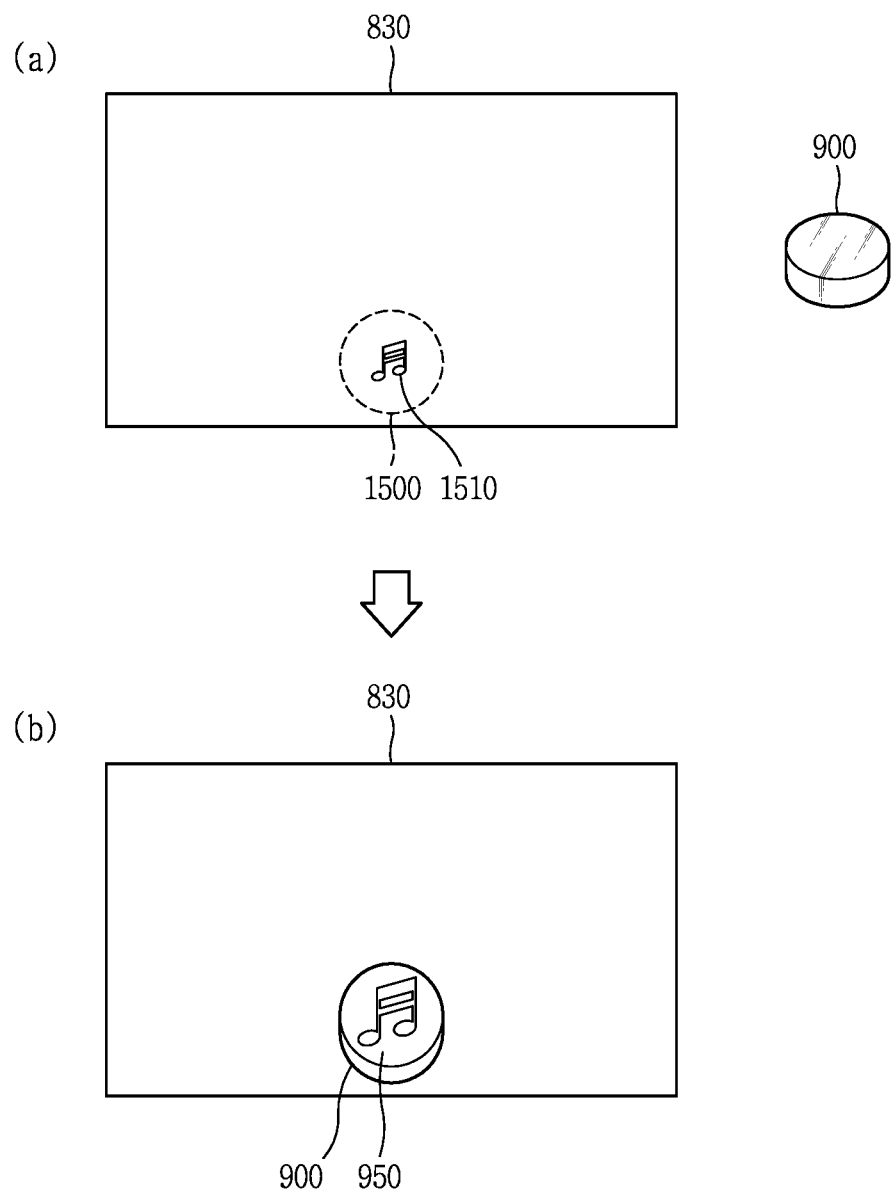

Referring to (a) of FIG. 15, screen information may be displayed on the display unit 830. The screen information may include any type of information such as a graphic object, an icon, an image, video, text, and the like.

Here, the detachable interface device 900 may be adhered to the display unit 830 according to a user operation. The detachable interface device 900 may be adhered to one region of the display unit 830.

Here, the one region of the display unit 830 may be a region 1500 in which the detachable interface device 900 is adhered to the display unit 830.

As described above, the detachable interface device 900 may include the display module 950 displaying screen information displayed on the display unit 830. The display module 950 may include the lens 950 or as a display module 951.

In detail, as described above, the detachable interface device 900 may include the display module 950 displaying screen information 1510 displayed in one region 1500 of the display unit 830 and a rotary input module (e.g., knob 903) which is disposed at an edge of the display module and rotatable.

When the detachable interface device 900 is adhered to one region 1500 of the display unit 830, the screen information 1510 displayed in one region 1500 of the display unit 830 may be displayed on the display module 950 of the detachable interface device 900.

Here, the display module may include a lens.

Also, when the detachable interface device 900 is adhered to one region 1500 of the display unit 830, the screen information 1510 displayed in the one region 1500 may be magnified and output through the display module 950 as illustrated in (b) of FIG. 15. Here, the lens may include a convex lens to magnify light (or information) output on the display unit 830.

Meanwhile, the display module 950 may include a lens, and the lens may include a concave lens. In this case, the concave lens may be formed to converge (or reduce) light (or information) output on the display unit 830. In this, the screen information 1510 displayed on the one region 1500 may be reduced and output through the display module 950.

Meanwhile, when the detachable interface device 900 is adhered to one region of the display unit 830, the processor 870 may control the display unit 830 such that the detachable interface device 900 is moved, on the basis of a position of a graphic object displayed in the one region.

In detail, the processor 870 may slidably move the detachable interface device 900 on the basis of a position to which the detachable interface device 900 is adhered. In this case, the detachable interface device 900 may be moved by itself (automatically) on the display unit 830 although a user operation is not applied. Here, automatic moving of the detachable interface device 900 on the display unit 830 may mean that the detachable interface device 900 is moved in a state of being adhered to the display unit 830.

Figure 16A:
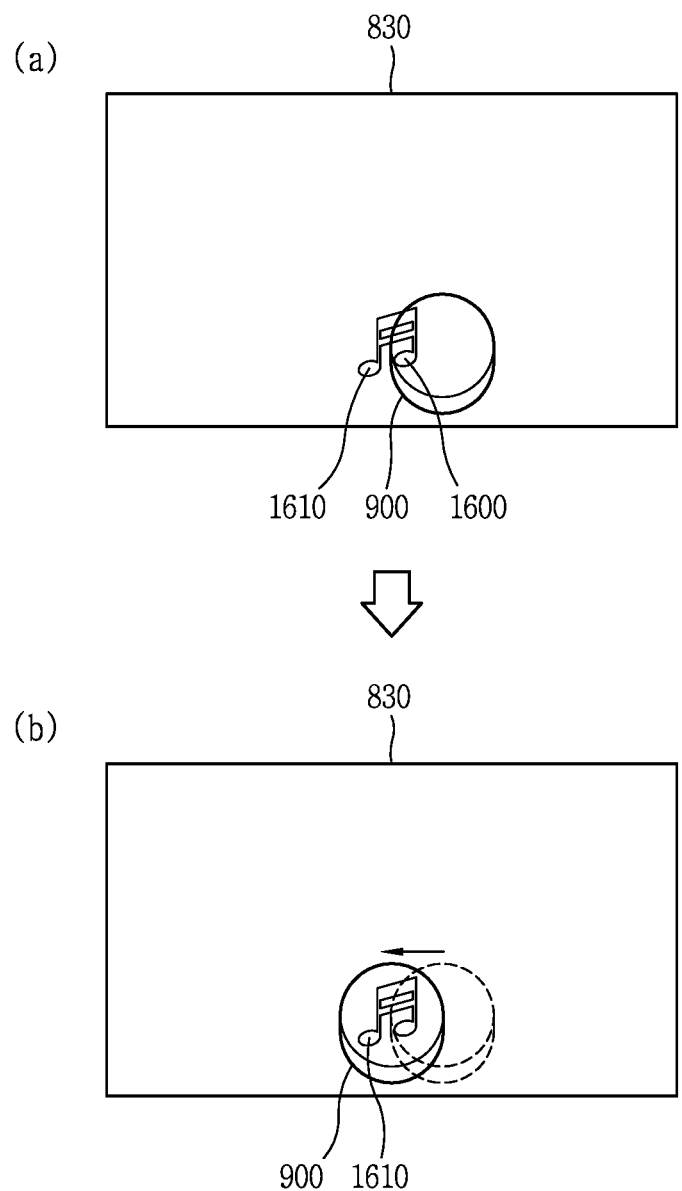

For example, as illustrated in (a) of FIG. 16A, the detachable interface device 900 may be adhered to one region 1600 of the display unit 830.

Here, the processor 870 may determine (sense or detect) a graphic object 1610 displayed on the one region 1600 in the screen information output on the display unit 830. That is, the processor 870 may determine the one region 1600 in which the detachable interface device 900 is adhered to the display unit 830 and the graphic object 1610 (or screen information) displayed on the one region 1600.

For example, the one region 1600 may not include the entirety of the graphic object 1610 but only a portion of the graphic object 1610.

In this case, as illustrated in (b) of FIG. 16A, the processor 870 may move the detachable interface device 900 such that the graphic object 160 is positioned at the center of the detachable interface device 900 or such that the graphic object 1610 is entirely included in the detachable interface device 900.

Here, the processor 870 may control at least one of the display unit 830 and the detachable interface device 900 such that the detachable interface device 900 may be moved by itself (automatically) in a state of being adhered to the display unit 830, rather than moving the detachable interface device 900 by a user operation (or by an external force by the user).

That is, as illustrated in (a) and (b) of FIG. 16A, the processor 870 may control the display unit 830 such that the detachable interface device 900 may be automatically moved in a state of being adhered to the display unit 830.

For example, the processor 870 may control an electromagnet provided to the display unit 830 to move the detachable interface device 900 by itself (automatically) in a state in which the detachable interface device 900 is adhered to the display unit 830.

Hereinafter, the method for moving the detachable interface device 900 by self (automatically) in a state of being adhered to the display unit 830 by the processor 870 without a user operation will be described in detail.

Figure 16B:
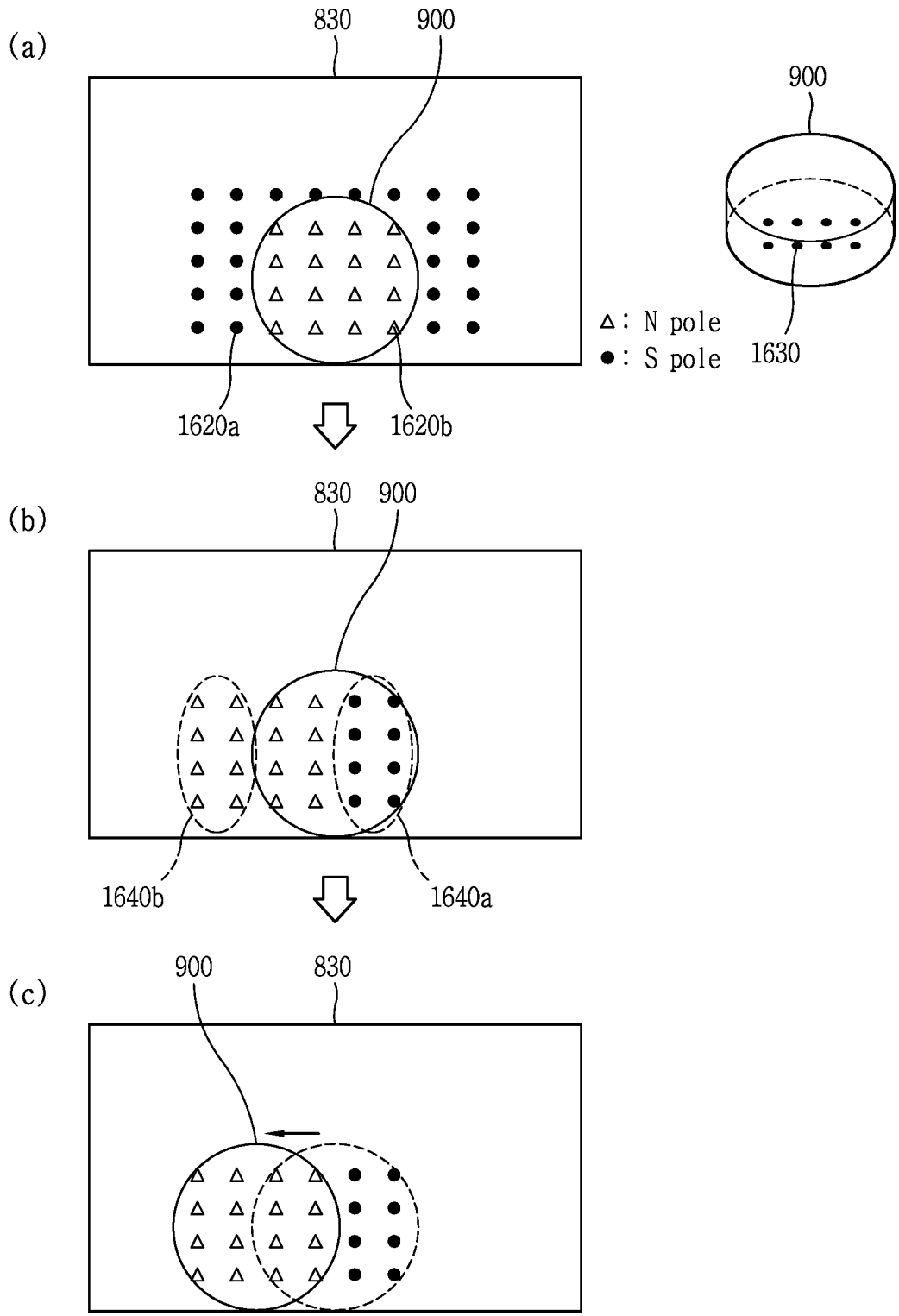

For example, referring to (a) of FIG. 16B, the display unit 830 may include a plurality of electromagnets 1620a and 1620b disposed on the display unit 830 and formed to vary a magnetic pole (e.g., N pole or S pole).

Also, the detachable interface device 900 may include a magnet 1630 formed to have any one pole (N pole or S pole). Here, the magnet 1630 provided in the detachable interface device 900 may be a permanent magnet.

The processor 870 may control a magnetic pole of the plurality of electromagnets 1620a and 1620b such that the detachable interface device 900 may be automatically moved in a state of being adhered to the display unit 830.

For example, the processor 870 may sense whether the detachable interface device 900 having the magnet 1630 formed to have any one magnetic pole approaches the display unit 830 through an electromagnet provided in the sensing unit 820 or the display unit 830.

For example, when the detachable interface device 900 approaches the display unit 830, the processor 870 may sense a region that the detachable interface device 900 approaches, on the basis of a change in a magnetic field or a change in strength of magnetic force.

Also, on the basis of a direction of a magnetic field sensed when the detachable interface device 900 approaches the display unit 830, the processor 870 may determine a magnetic pole (N pole or S pole) of the magnet provided in the detachable interface device 900.

Thereafter, the processor 870 may determine a magnetic pole of the plurality of electromagnets provided on a rear surface of the display unit 830 such that the approaching detachable interface device 900 may be adhered to the display unit 830.

For example, the processor 870 may adjust a magnetic pole of the electromagnet 1620b provided in one region the detachable interface device 900 approaches, among the plurality of electromagnets provided on the rear surface of the display unit 830, to a magnetic pole opposite to a magnetic pole of a magnet provided in the detachable interface device 900.

For example, as illustrated in (a) of FIG. 16B, in case where a magnetic pole of the magnet 1630 provided in the detachable interface device 900 is the S pole, the processor 870 may adjust a magnetic pole of the electromagnet 1620b provided in one region that the detachable interface device 900 approaches, among the plurality of electromagnets provided on the rear surface of the display unit 830, to the N pole.

Also, the processor 870 may adjust a magnetic pole of the electromagnet 1620a provided in a region other than the one region that the detachable interface device 900 approaches, among the plurality of electromagnets provided on the rear surface of the display unit 830, to the same magnetic pole as that of the magnet provided in the detachable interface device 900.

For example, as illustrated in (a) of FIG. 16B, when a magnetic pole of the magnet 1630 provided in the detachable interface device 900 is the S pole, the processor 870 may adjust a magnetic pole of the electromagnet 1620a provided in a region other than the one region that the detachable interface device 900 approaches, among the plurality of electromagnets provided on the rear surface of the display unit 830, to the S pole. In another example, the processor 870 may set the electromagnet 1620a provided in a region other than the one region that the detachable interface device 900 approaches, not to have a magnetic pole.

Accordingly, the detachable interface device 900 of the present disclosure may be adhered to one region of the display unit 830 through magnetic force.

Meanwhile, in case where the detachable interface device 900 is required to be automatically moved according to a position of a graphic object displayed in one region of the display unit 830 with the detachable interface device 900 adhered thereto, the processor 870 may control the electromagnet provide don the rear surface of the display unit 830.

For example, as illustrated in (b) of FIG. 16B, in a state in which the detachable interface device 900 is adhered to the display unit 830, the detachable interface device 900 may be required to be moved in one direction (e.g., in a leftward direction).

Here, the processor 870 may change a magnetic pole of at least one first electromagnet 1640a (e.g., an electromagnet disposed in a direction opposite to one direction) of the electromagnets of the display unit 830 included in one region to which the detachable interface device 900 is adhered, into the same magnetic pole (S pole) as the magnetic pole (e.g., S pole) of the magnet 1630 of the detachable interface device 900. Here, the first electromagnet may be a plurality of electromagnets.

Also, the processor 870 may change a magnetic pole of at least one second electromagnet (e.g., an electromagnet disposed in the one direction) of at least some of the electromagnets of the display unit 830 disposed near the one region to which the detachable interface device 900 is adhered, into a magnetic pole (N pole) different from the magnetic pole (e.g., S pole) of the magnet 1630 of the detachable interface device 900. Here, the second electromagnet may be a plurality of electromagnets.

Accordingly, a predetermined repulsive force is generated in the one region 1640a of the display unit 830 to which the detachable interface device 900 is adhered, and a predetermined attraction is generated between the region 1640b near the one region and the detachable interface device 900.

Accordingly, as illustrated in (c) of FIG. 16B, even without a user operation, the processor 870 may automatically move the detachable interface device 900 in one direction in a state of being adhered to the display unit 830.

Through this configuration, when the detachable interface device 900 is adhered to the one region of the display unit 830, the processor 870 may control the display unit 830 (specifically, the electromagnet of the display unit 830) such that the detachable interface device 900 may be moved in a state of being adhered to the display unit 830 on the basis of a position of a graphic object displayed in the one region (or on the basis of a graphic object displayed in a region to which the detachable interface device 900 is adhered).

Meanwhile, the method described above may be inferred and applied in the same or similar manner even in case where a magnet having any one magnetic pole is provided in the display unit 830 and a plurality of electromagnets formed to vary a magnetic pole are provided in the detachable interface device 900 and in case where a plurality of electromagnets formed to vary a magnetic pole are provided in both the display unit 830 and the detachable interface device 900.

For example, the processor 870 may control at least one of the electromagnet provided in the detachable interface device 900 and the electromagnet provided in the display unit 830 such that the detachable interface device 900 may be moved in a state of being adhered to the display unit 830 on the basis of a position of a graphic object displayed in one region of the display unit 830 to which the detachable interface device 900 is adhered.

Meanwhile, when the detachable interface device 900 is adhered to one region of the display unit 830, the processor 870 of the present disclosure may control the display unit 830 such that a display position of the graphic object is changed on the basis of a position of the graphic object displayed in the one region.

Figure 17A:
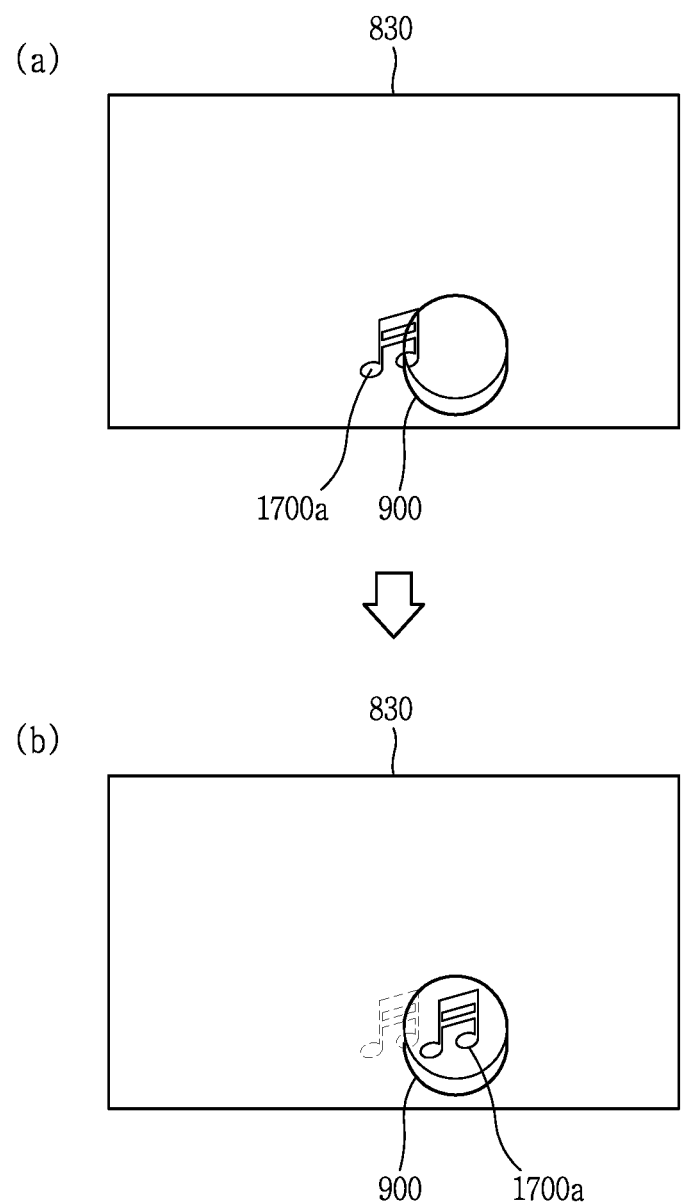

For example, as illustrated in (a) of FIG. 17A, in case where the detachable interface device 900 is adhered to one region of the display unit 830, the one region may include only a portion of a graphic object 1700a. That is, the detachable interface device 900 may be adhered to the display unit 830 such that only a portion of the graphic object is included in the detachable interface device 900.

In this case, as illustrated in (b) of FIG. 17A, in case where the detachable interface device 900 is adhered to one region of the display unit 830 and a portion of a graphic object 1700a is included in the one region, the processor 870 may control the display unit 830 such that the entirety of the graphic object is included in the one region.

That is, in case where only a portion of the graphic object 1700a is included in the one region, the processor 870 may change a display position of the graphic object such that the graphic object is entirely included in the one region (or the detachable interface device 900).

Meanwhile, when the detachable interface device 900 is adhered to one region of the display unit 830, the processor 870 may control the display unit 830 such that a display size of the graphic object is changed on the basis of a size of the graphic object displayed in the one region.

For example, as illustrated in (a) of FIG. 17B, when the detachable interface device 900 is adhered to one region of the display unit 830, the processor 870 may control the display unit 830 such that an output size of a graphic object 1700b is varied on the basis of a size of the one region.

For example, in case where the detachable interface device 900 is adhered to one region of the display unit 830 and a size of the graphic object 1700b displayed in the one region is greater than a size of the one region, the processor 870 may reduce an output size of the graphic object 1700b such that the graphic object 1700b is entirely included in the one region (or the detachable interface device 900) as illustrated in (b) of FIG. 17B.

In this manner, in the present disclosure, when the detachable interface device 900 in a separated state is adhered to the display unit 830, an optimized user interface capable of moving the detachable interface device 900 or varying a display position/output size of the graphic object on the basis of one region (position) to which the detachable interface device 900 is adhered or a position/size of the graphic object displayed in one direction to which the detachable interface device 900 is adhered.

The contents described above may be applied to both a case where the display module 950 of the detachable interface device 900 is formed as a lens 901 and a case where the display module 950 is formed as a display module 951.

In case where the display module 950 of the detachable interface device 900 is formed as the display module 951, the processor 870 may transmit screen information displayed in one region of the display unit 830 to which the detachable interface device 900 is adhered, to the detachable interface device 900 through the communication unit 810.

Thereafter, the control module 970 of the detachable interface device 900 may output screen information corresponding to the screen information on the display module 951 on the basis of the screen information received through the communication module 940.

Accordingly, although the detachable interface device 900 is adhered to the one region of the display unit 830, the screen information displayed in the one region of the display unit 830 may be displayed on the display module 951 of the detachable interface device 900.

As described above, although the detachable interface device 900 is automatically moved or a position or a size of a graphic object displayed on the display unit is varied, screen information displayed in the one region of the display unit 830 to which the detachable interface device 900 is adhered may be output through the detachable interface device 900 in a real time.

Meanwhile, the detachable interface device 900 may include a touch sensor. For example, the touch sensor may be provided in the rotary input module or the display module.

When the detachable interface device 900 is adhered to the display unit 830, the processor 870 may sense the number of fingers gripping the detachable interface device 900 through the touch sensor. For example, the control module 970 of the detachable interface device 900 may determined the number of fingers gripping the detachable interface device 900 through the touch sensor.

Thereafter, when the detachable interface device 900 is adhered to the display unit 830, the control module 970 may transmit information regarding the determined number of fingers to the vehicle control device 800 through the communication module 940.

The processor 870 may sense the number of fingers griping the detachable interface device 900 on the basis of the information regarding the number of fingers.

Here, the processor 870 may perform different functions on the basis of the sensed number of fingers.

For example, as illustrated in (a) of FIG. 18, when the detachable interface device 900, in a state of being gripped by N number of fingers (e.g., two fingers), is adhered to the display unit 830, the processor 870 may execute a first function among functions which can be executed in the vehicle.

In another example, as illustrated in (b) of FIG. 18, when the detachable interface device 900, in a state of being gripped by M number of fingers (e.g., three finger) (N and M are different natural numbers), is adhered to the display unit 830, the processor 870 may execute a second function different from the first function, among the functions that can be executed in the vehicle.

Meanwhile, when the detachable interface device 900 is adhered to the display unit 830, the processor 870 may execute different functions on the basis of whether a touch (or push) is maintained on the display module 950.

For example, when the detachable interface device 900 is adhered to the display unit 830 in a state in which a touch (or push) is applied to the display module 950, the processor 870 may perform a third function which can be executed in the vehicle.

In another example, when the detachable interface device 900 is adhered to the display unit 830 in a state in which a touch (or push) is not applied to the display module 950, the processor 870 may perform a fourth function (different from the third function) which can be executed in the vehicle.

Through this configuration, the present disclosure may provide the new vehicle control device capable of executing an optimized function according to a scheme of operating the detachable interface device 900 when the detachable interface device 900 is adhered to the display unit 830.

Meanwhile, the present disclosure may provide a vehicle control device capable of varying adhesion between the detachable interface device 900 and the display unit 830 on the basis of a driving mode of the vehicle.

As described above, the display unit 830 included in the vehicle control device 800 of the present disclosure may include a plurality of electromagnets formed to vary strength of magnetic force.

Also, the detachable interface device 900 may have a magnet formed to have any one magnetic pole.

The processor 870 may adjust an electromagnet included in one region of the display unit 830 to which the detachable interface device 900 is adhered, to have a magnetic pole opposite to a magnetic pole of the magnet of the detachable interface device 900.

For example, when the magnet of the detachable interface device 900 has the S pole, the electromagnet included in one region of the display unit 830 to which the detachable interface device 900 is adhered may be the N pole. Accordingly, attraction may act between the detachable interface device 900 and the display unit 830 so as to be adhered to each other.

Meanwhile, the processor 870 may determine strength of magnetic force provided in the plurality of electromagnets of the display unit 830 such that adhesion is varied on the basis of a driving mode of the vehicle.

For example, as illustrated in (a) of FIG. 19A, in case where a driving mode of the vehicle is an autonomous driving mode, the processor 870 may control the display unit 830 such that magnetic force has a first strength.

In another example, as illustrated in (b) of FIG. 19A, in case where a driving mode of the vehicle is a manual driving mode, the processor 870 may control the display unit 830 such that magnetic force has a second strength greater than the first strength.

Varying strength of magnetic force may refer to varying adhesion between the display unit 830 and the detachable interface device 900.

That is, adhesion between the display unit 830 and the detachable interface device 900 may be stronger in the manual driving mode than in the autonomous driving mode.

Accordingly, in the present disclosure, in the autonomous driving mode, the detachable interface device 900 may be relatively easily detached from the display unit 830, and in the manual driving mode, the detachable interface device 900 is difficult to separate, thus obtaining safety of driving a vehicle.

Meanwhile, in the present disclosure, even in a state in which a driving mode of the vehicle is the manual driving mode, the display unit 830 may be controlled to have different strengths (adhesions) of magnetic force according to whether the detachable interface device 900 is adhered to the display unit 830 or separated from the display unit 830.

For example, as illustrated in (a) of FIG. 19B, when the detachable interface device 900 is adhered to the display unit 830 in a state in which the vehicle is in the manual driving mode, the processor 870 may adjust strength of magnetic force of the electromagnet (or adhesion of the detachable interface device 900) to a maximum level.

In another example, as illustrated in (b) of FIG. 19B, when the detachable interface device 900 is separated from the display unit 830 in a state in which the vehicle is in the manual driving mode, the processor 870 may adjust strength of magnetic force (or adhesion of the detachable interface device 900) to a minimum level. In this case, the detachable interface device 900 may not be adhered to the display unit 830.

Accordingly, in the present disclosure, when the detachable interface device 900 is in a state of being adhered to the display unit 830 in the manual driving mode, the detachable interface device 900 is maintained not to be separated, and when the detachable interface device 900 is in a state of being separated from the display unit 830, the detachable interface device 900 is maintained not to be adhered to the display unit 830, whereby attaching and detaching the detachable interface device 900 during driving of the vehicle is prohibited to thus enhance stability of the driving of the vehicle.

Meanwhile, the present disclosure may provide a new user interface for extracting screen information displayed on the display unit 830 like a pipette and displaying the screen information on another display unit.

Figure 20A:
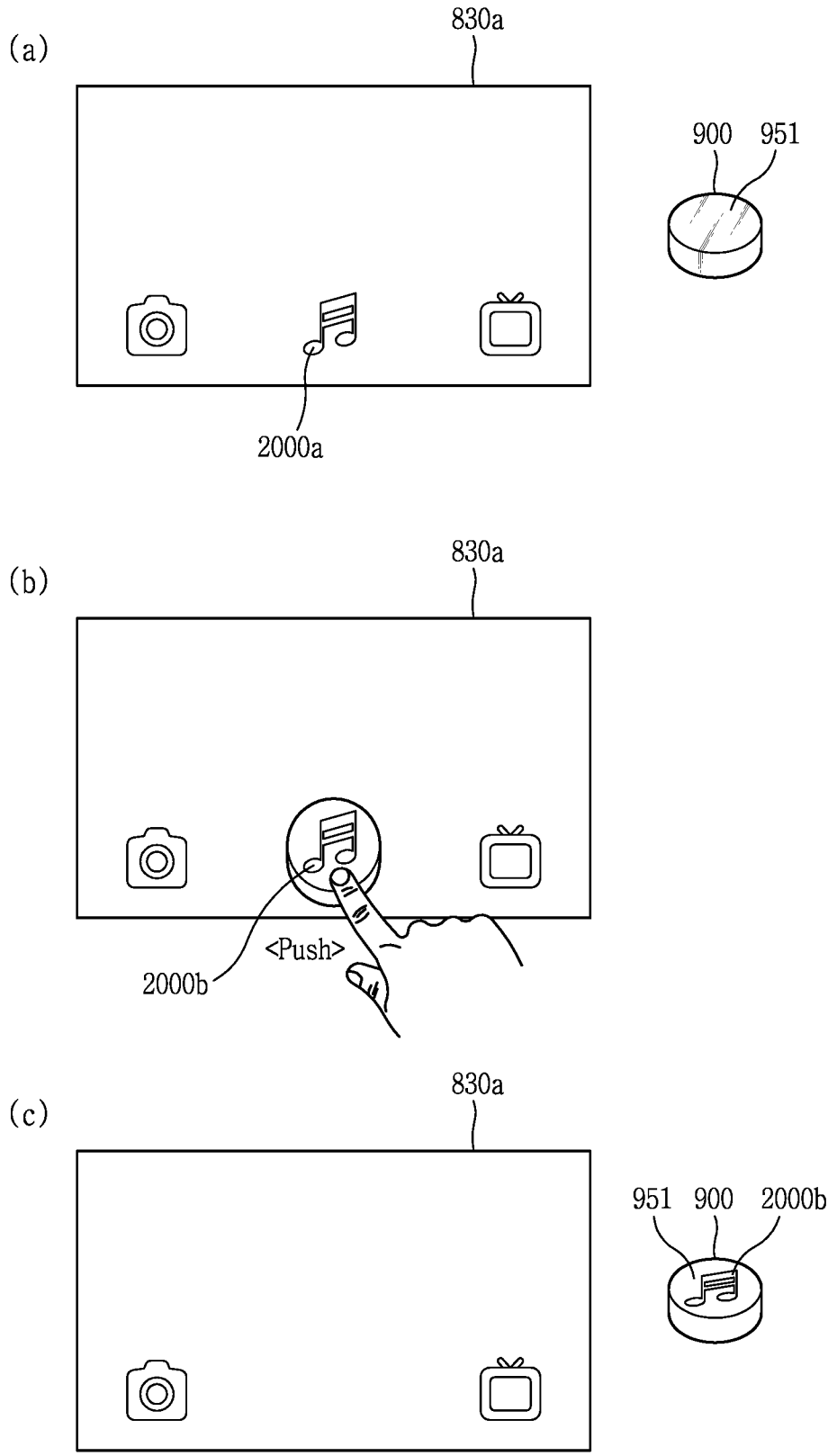

As illustrated in (a) of FIG. 20A, at least one graphic object (or screen information) 2000a may be displayed on the display unit 830.

The display module 950 provided in the detachable interface device 900 is the display module 951 formed to be pushed.

When the detachable interface device 900 is adhered to one region of the display unit 830 as illustrated in (b) of FIG. 20A, second screen information 2000b corresponding to the first screen information 2000a displayed in the one region may be output on the display module 951 of the detachable interface device 900 as illustrated in (b) of FIG. 20A.

In case where the display module 950 of the detachable interface device 900 is formed as the display module 951, the processor 870 may transmit the screen information displayed in the one region of the display unit 830 to which the detachable interface device 900 is adhered, to the detachable interface device 900 through the communication unit 810.

In detail, the processor 870 may determine (sense, detect, or extract) one region of the display unit 830 to which the detachable interface device 900 is adhered, through the sensing unit 820 or the display unit 830. Thereafter, the processor 870 may determine screen information (or graphic object) output in the one region of the display unit 830.

The processor 870 may transmit the determined screen information to the detachable interface device 900 through the communication unit 810.

Thereafter, on the basis of the screen information received through the communication module 940, the control module 970 of the detachable interface device 900 may output screen information corresponding to the screen information on the display module 951.

Accordingly, although the detachable interface device 900 is adhered to the one region of the display unit 830, screen information displayed in the one region of the display unit 830 may be displayed on the display module 951 of the detachable interface device 900.

Here, the first screen information displayed in the one region of the display unit 830 and the second screen information output on the display module 951 of the detachable interface device 900 may correspond to each other. Also, the first screen information and the second screen information may be substantially the same.

As illustrated in (b) of FIG. 20A, in a state in which the second screen information 2000b is output on the display module 2000b, when a push input is applied to the display module 951, the processor 870 may control the display unit 830 not to output the first screen information 2000a.

That is, in a state in which the detachable interface device 900 is adhered to one region of the display unit 830, when a push input is applied to the display module 951 of the detachable interface device 900, the processor 870 may not output screen information, which has been output on the one region of the display unit 830, any longer.

In this case, as illustrated in (c) of FIG. 20A, the screen information 2000a output on the one region of the display unit 830 to which the detachable interface device 900 is adhered may not be output any longer as the push input is applied to the detachable interface device 900.

Meanwhile, after the push input is applied, although the detachable interface device 900 is separated from the display unit 830, the display module 951 may maintain outputting of the second screen information corresponding to the first screen information as illustrated in (c) of FIG. 20A.

That is, when the push input is received, the detachable interface device 900 may fix the screen information being output on the display module 951. In this case, regardless of whether the detachable interface device 900 is separated or moved or regardless of whether the screen information output on the display unit 830 is not output any longer, outputting of the screen information (second screen information 2000b) output on the display module 951 may be maintained.

Through this configuration, the present disclosure may provide the new user interface allowing the detachable interface device 900 to extract screen information displayed on the display unit 830, like a pipette.

Meanwhile, the display unit 830 provided in the vehicle control device (or vehicle) of the present disclosure may include a plurality of displays.

For example, FIG. 20B may be an embodiment which can be performed in the first display 830a.

Referring to (a) of FIG. 20B, the detachable interface device 900 including the display module 951 on which the second screen information 2000b is displayed may be adhered to a second display 830b different from the first display 830a on which the first screen information 2000a has been output according to a user operation.

Here, since the detachable interface device 900 including the display module 951 displaying the second screen information 2000b is adhered to the second display 830b different from the first display 830a which outputted the first screen information 2000a, the processor 870 may output third screen information corresponding to the second screen information on the second display 830b.

In this case, as illustrated in (b) of FIG. 20B, third screen information 2000c corresponding to the second screen information may be output on one region to which the detachable interface device 900 is adhered in the second display 830b. Also, the second screen information 2000b may also be output on the display module 951 of the detachable interface device 900.

The first screen information display in one region of the first display 830a, the second screen information output on the display module 951 of the detachable interface device 900, and the third screen information displayed in one region of the second display 830b may correspond to each other. Also, the first screen information, the second screen information, and the third screen information may be substantially the same.

Here, when a push input is applied to the display module 951 in a state in which the display module 951 is adhered to the second display 830b, the detachable interface device 900 may not output the second screen information on the display module 951 any longer.

In this case, when a push input is received in a state in which the detachable interface device 900 is adhered to one region of the second display 830b, the second screen information may not be output on the detachable interface device 900.

In the above, it is described that the processor 870 outputs the third screen information corresponding to the second screen information on the second display 830b as the detachable interface device 900 is adhered to the second display 830b, but the present disclosure is not limited thereto.

For example, although the detachable interface device 900 is adhered to the second display 830b, the processor 870 may not output the third information corresponding to the second screen information on the display 830b.

Meanwhile, when a push input is applied to the display module 951 after the detachable interface device 900 is adhered to the second display 830b, the processor 870 may output the third screen information corresponding to the second screen information on the second display 830b.

This may be understood as an operation like discharging a liquid from a pipette.

Here, after the detachable interface device 900 is adhered to the second display 830b, when a single push input is applied to the display module 951, the processor 870 may not output the second screen information displayed on the detachable interface device 900 any longer and output the third screen information corresponding to the second screen information on the second display 830b.

A first case in which as the detachable interface device 900 outputting certain screen information is adhered to a certain display, the certain screen information is output to the certain display and a second case in which after the detachable interface device 900 outputting certain screen information is adhered to a certain display, when a push input is received, the certain screen information is output to the certain display may be determined according to a user setting.

Thereafter, as illustrated in (c) of FIG. 20B, when a push input is applied to the display module 950 of the detachable interface device 900 adhered to the second display 830b, the third screen information 2000c corresponding to the second screen information is output on one region of the second display 830b to which the detachable interface device 900 is adhered and the second screen information may not be output on the detachable interface device 900 any longer.

In some implementations, the detachable interface device 900 can include a communication unit and a memory. When the detachable interface device 900 receives user input, e.g., physical push input from a user, the communication unit of the detachable interface device 900 obtains data about screen information that is displayed on a region of a first display. In this example, the region of the first display can be the region to which the detachable interface device 900 is coupled. The communication unit provides the data to the memory and the memory stores the data.

When the detachable interface device 900 is decoupled from the first display and is coupled to a second display unit, the communication unit provides the data stored in the memory to the second display. Based on the data, the second display displays the screen information.

Meanwhile, a function corresponding to the first screen information 2000*a* and a function corresponding to the third screen information 2000*c* may be the same.

For example, as illustrated in (a) of FIG. 20C, a function (video play function) corresponding to first screen information 2010*a* may be executed on the first display 830*a*.

When a first push input is received in a state in which the detachable interface device 900 is adhered to the first display 830*a*, the processor 870 may temporarily stop the executed function as illustrated in (b) of FIG. 20C.

Also, when the first push input is received, the processor 870 may output second screen information 2010*b* corresponding to the first screen information 2010*a* on the detachable interface device 900 as illustrated in (c) of FIG. 20C. In this case, the first screen information 2010*a* output on the first display 830*a* may not be output any longer.

The second screen information 2010*b* may correspond to the first screen information 2010*a*, and a function corresponding to the second screen information 2010*b* may be the same as a function corresponding to the first screen information 2010*a*.

In this case, the function corresponding to the second screen information 2010*b* output on the detachable interface device 900 may be temporarily stopped.

Thereafter, the detachable interface device 900 may be separated from the first display 830*a* and adhered to the second display 830*b* different from the first display 830*a* according to a user operation.

Here, the second screen information 2010*b* (or the function corresponding to the second screen information) displayed on the detachable interface device 900 may be maintained.

Thereafter, as illustrated in (d) of FIG. 20C, when the detachable interface device 900 displaying the second screen information 2010*b* is adhered to the second display 830*b* different from the first display 830*a*, the third screen information 2010*c* corresponding to the second screen information 2010*b* may be displayed on the second display 830*b*.

Here, the function corresponding to the third screen information 2010*c* may be temporarily stopped.

Thereafter, when a second push input is applied to the display module (or the second display 830*b*) in a state in which the detachable interface device 900 is adhered to the second display 830*b*, the processor 870 may resume executing the temporarily stopped function.

Meanwhile, after the detachable interface device 900 displaying the second screen information 2010*b* is adhered to the second display 830*b* different from the first display 830*a*, when a push input is applied to the detachable interface device 900, the processor 870 may the display third screen information 2010*c* corresponding to the second screen information 2010*b* on the second display 830*b* and resume executing the temporarily stopped function.

In the above, the case where a push input is applied to the display module 951 has been described, but the related contents may also be inferred and applied to a case where a touch input is applied to the display module 951 and a rotational input is applied to the rotary input module in the same or similar manner.

The first display 830*a* and the second display 830*b* may be included in the display unit 830 of the vehicle control device 800 (or the display unit 251 of the vehicle).

Through this configuration, the present disclosure may provide a new vehicle control device capable of controlling a plurality of displays using the detachable interface device 900 in an optimized manner.

Meanwhile, in the present disclosure, the display unit may be variously controlled using the detachable interface device 900.

Figure 21:
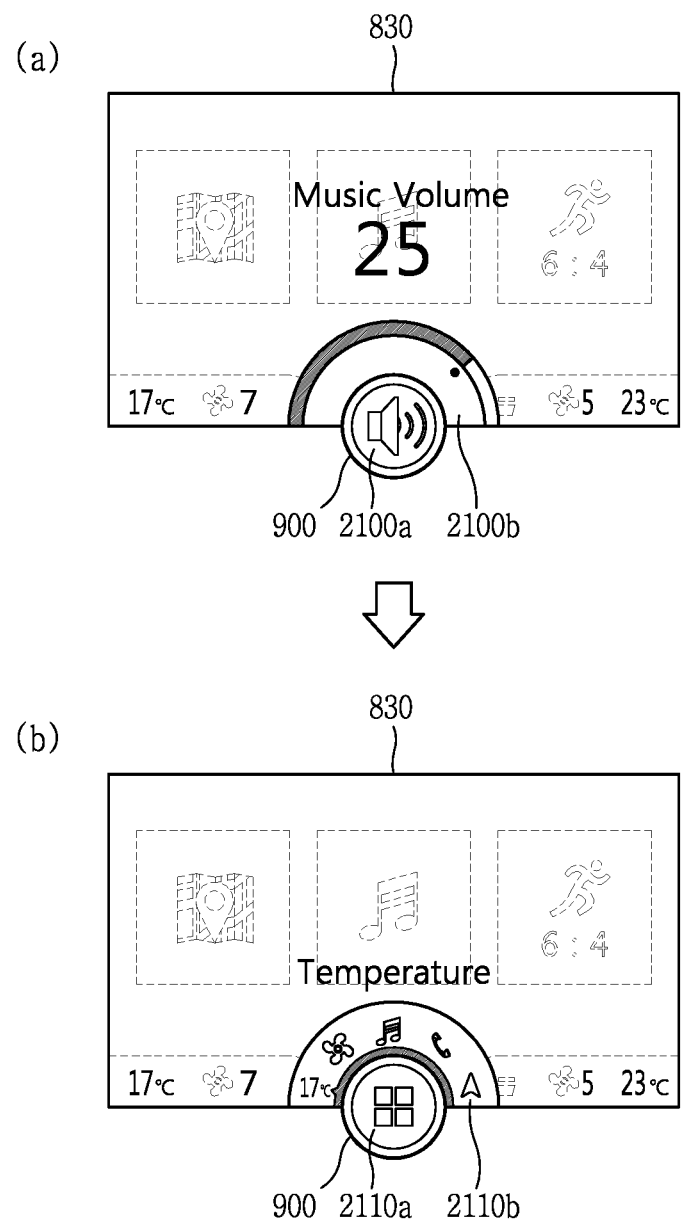

Referring to (a) of FIG. 21, the processor 870 may sense whether the detachable interface device 900 is adhered to a graphic object which can be selected on the display unit 830.

When the detachable interface device 900 is adhered to a graphic object 2100*a* which can be selected on the display unit 830, the processor 870 may output screen information related to the graphic object 2100*a* to a region adjacent to one region to which the detachable interface device 900 is adhered.

For example, as illustrated in (a) of FIG. 21, when the graphic object 2100*a* is a graphic object 2100*a* associated with a volume adjusting function, the processor 870 may output screen information (e.g., a progress bar 2100*b*) related to the graphic object 2100*a* to a region adjacent to the region to which the detachable interface device 900 is adhered.

In another example, as illustrated in (b) of FIG. 21, in case where an upper menu icon 2110*a* is output on a region to which the detachable interface device 900 is adhered, the processor 870 may output a lower menu icon 2110*b* on a region adjacent to the region.

Meanwhile, as illustrated in (a) of FIG. 22, the processor 870 may control a function related to the vehicle through the detachable interface device 900 on the display 830*a*. In this case, screen information 2200*b* related to the function 2200*a* may be output on the first display 830*a*.

As illustrated in (b) of FIG. 22, when the detachable interface device 900 is separated from the first display 830*a* and is adhered to the second display 830*b* while the function 2200*a* is being controlled, execution of the function 2200*a* related to the vehicle may be maintained and screen information 2200*b* related to the function 2200*a* may be output on the second display 830*b*.

In this case, the screen information 2200*b* is not output any longer on the first display 830*a* from which the detachable interface device 900 is separated, and other screen information may be output thereon.

Meanwhile, in the present disclosure, different functions may be executed or different pieces of screen information may be output on the display unit 830 according to positions to which the detachable interface device 900 is adhered.

Figure 23:
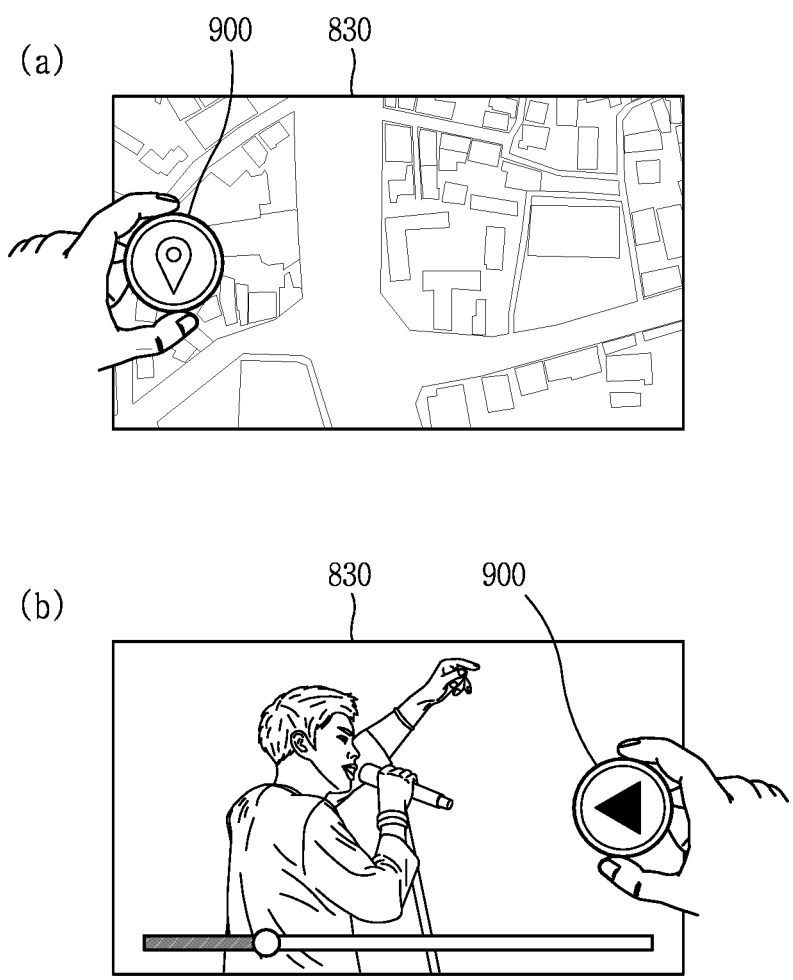

For example, as illustrated in (a) of FIG. 23, when the detachable interface device 900 is adhered to a preset first region (e.g., left region) of the display unit 830, the processor 870 may execute a first function (e.g., a navigation function) related to the vehicle and output screen information corresponding to the first function on the display unit 830.

In another example, as illustrated in (b) of FIG. 23, when the detachable interface device 900 is adhered to a preset second region (e.g., right region) of the display unit 830, the processor 870 may execute a second function (e.g., a video play function) related to the vehicle and output screen information corresponding to the second function on the display unit 830.

Meanwhile, the processor 870 may magnify (zoom in) or reduce (zoom out) screen information output on the display unit 830 on the basis of a position to which the detachable interface device 900 is adhered.

Figure 24:
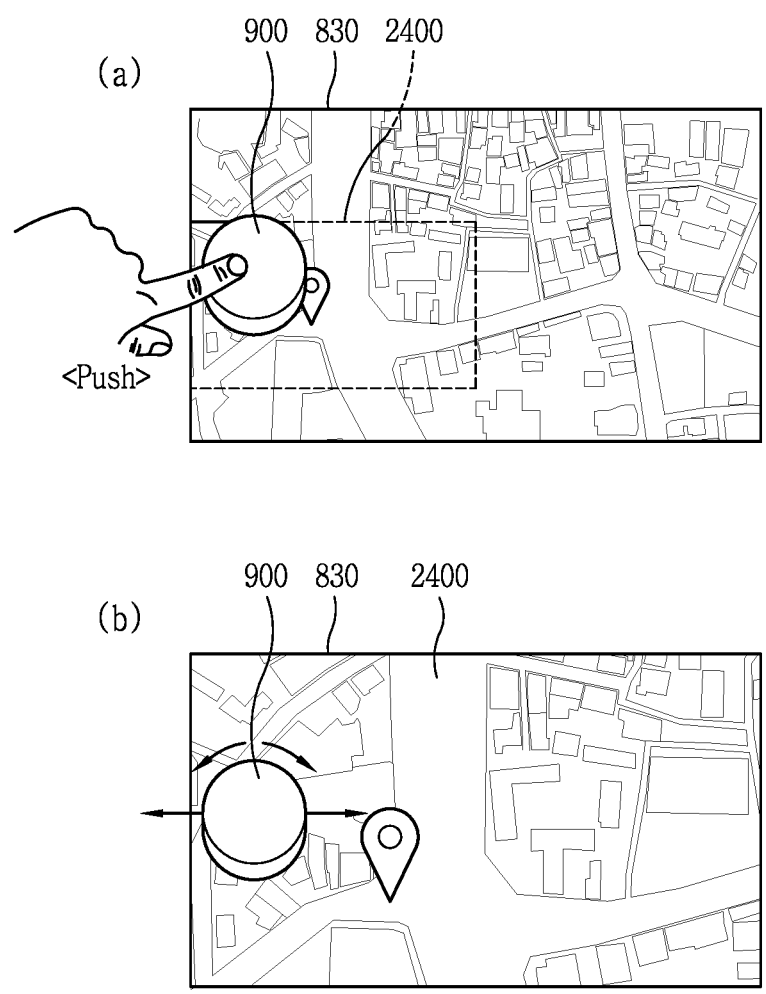

For example, as illustrated in (a) of FIG. 24, screen information which can be magnified (zoom in) or reduced (zoom out) may be output on the display unit 830.

Here, when the detachable interface device 900 is adhered to the display unit 830, the processor 870 may determine a position to which the detachable interface device 900 is adhered.

Thereafter, when a user input (e.g., rotation of the rotary input module) of magnifying (zoom in) or reducing (zoom out) is received through the detachable interface device 900, the processor 870 may magnify (zoom in) or reduce (zoom out) the screen information on the basis of a position 2400 to which the detachable interface device 900 is adhered.

Also, the processor 870 may determine a type of a user who adheres the detachable interface device 900 to the display unit 830 through the sensing unit 820. Also, the processor 870 may output different pieces of screen information on the display unit, execute different functions, or set different execution rights according to types of user.

Also, the processor 870 may change a kind of function (or application) on the basis of a push input (or touch input) applied to the display module 950 of the detachable interface device 900.

That is, the processor 870 may change an application executed whenever a push input is applied to the detachable interface device 900. Here, different types of screen information may be output on the display module 950 of the detachable interface device 900 whenever the executed application is changed.

Meanwhile, when screen information output on the display unit 830 is displayed on the detachable interface device 900 on the basis of a push input applied in a state in which the detachable interface device 900 is adhered to the display unit 830, the processor 870 may execute a function corresponding to the screen information although the detachable interface device 900 is separated from the display unit 830.

For example, after it is manipulated to output screen information corresponding to the first function on the detachable interface device 900 (refer to FIGS. 20A to 20C), although the detachable interface device 900 is separated from the display unit 830, the processor 870 may execute the first function in response to a user input applied to the separated detachable interface device 900.

The embodiments of the present disclosure have the following advantages and effects.

First, the present disclosure may provide a detachable interface device which can be attached to or detached from the display unit and provide various UI/UX by using the detachable interface device.

Second, the present disclosure may provide a new detachable interface device which can be automatically moved according to a position to which the detachable interface device is adhered to the display unit.

Third, the present disclosure may provide the vehicle control device capable of changing screen information displayed on the display unit in an optimized manner by utilizing the detachable interface device, and the control method thereof.

Fourth, the present disclosure may provide a new vehicle interface system capable of utilizing a plurality of display units provided in a vehicle through the detachable interface device in an optimized manner.

Advantages and effects of the present invention that may be obtained in the present invention are not limited to the foregoing effects and any other technical effects not mentioned herein may be easily understood by a person skilled in the art from the present disclosure and accompanying drawings.

The vehicle control device 800 described above may be included in the vehicle 100.

Also, the operation or control method of the vehicle control device 800 described above may be inferred and applied as an operation or control method of the vehicle 100 (or the controller 170) in the same or similar manner.

The foregoing steps may be performed by the controller 170 provided in the vehicle 100, as well as by the vehicle control device 800.

Also, all the functions, components and control methods performed by the vehicle control device 800 described above may be performed by the controller 170 provided in the vehicle 100. That is, all the control methods described in this disclosure may be applied to the control method of the vehicle or to the control method of the control device.

In addition, the vehicle control device 800 described above may be a mobile terminal. In this case, all the functions, components and control methods performed by the vehicle control device 800 may be performed by a controller of the mobile terminal. Also, all the control methods described in this disclosure may be inferred and applied to the control method of the mobile terminal in the same or similar manner.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle control device comprising:
a display unit;
an interface device that is configured to be coupled to or uncoupled from the display unit, the interface device including a display module; and
a processor that is configured to:
determine whether the interface device is coupled to or uncoupled from the display unit, and
based on a determination that the interface device is coupled to or uncoupled from the display unit, control at least one of the display unit and the interface device,
wherein the processor is further configured to:
determine whether the interface device is coupled to a first region of the display unit,
based on a determination that the interface device is coupled to the first region of the display unit, control the display module to display screen information that is displayed on the first region of the display unit, and
based on (i) a determination that the interface device is coupled to the first region of the display unit and (ii) a position of a graphic object that is displayed on the first region of the display unit, control the display unit to move the interface device.

2. The vehicle control device of claim 1, wherein the interface device includes:
a rotary input module that is coupled to the display module and that is configured to rotate.

3. The vehicle control device of claim 2, wherein the display module includes a lens, and
wherein the lens is configured to (i) magnify the screen information that is displayed on the first region of the display unit and (ii) display the magnified screen information.

4. The vehicle control device of claim 2, wherein the rotary input module includes:
a conductive unit that is configured to rotate based on physical user input, and
a rotation detection unit that is configured to:
detect a rotational movement of the conductive unit, and
based on the rotational movement of the conductive unit, control information that is displayed on the display module.

5. The vehicle control device of claim 1, wherein the processor is configured to move the interface device to (i) locate a particular portion of the interface device over the graphic object or (ii) cover the graphic object with the interface device.

6. The vehicle control device of claim 1, wherein the processor is configured to move the interface device while the interface device is coupled to the display unit.

7. The vehicle control device of claim 6, wherein the display unit includes a plurality of electromagnets that are coupled to a first surface of the display unit, each of the plurality of electromagnets being configured to change a magnetic pole of the electromagnet,
wherein the interface device includes a magnet that has a first magnetic pole, and
wherein the processor is configured to control a respective magnetic pole of at least one of the plurality of electromagnets to move the interface device based on magnetic force between the magnet of the interface device and the at least one of the plurality of electromagnets.

8. The vehicle control device of claim 7, wherein the display unit includes a plurality of electromagnets that are coupled to a second surface of the display unit, each of the plurality of electromagnets being configured to change magnetic force of the electromagnet, and
wherein the processor is configured to control magnetic force of at least one of the plurality of electromagnets based on a driving mode of a vehicle that is associated with the vehicle control device.

9. The vehicle control device of claim 8, wherein, in a state in which the driving mode of the vehicle is an autonomous driving mode, the processor is configured to control the magnetic force of the at least one of the plurality of electromagnets to have a first value, and
wherein, in a state in which the driving mode of the vehicle is a manual driving mode, the processor is configured to control the magnetic force of the at least one of the plurality of electromagnets to have a second value that is greater than the first value.

10. The vehicle control device of claim 8, wherein, in a state in which the driving mode of the vehicle is a manual driving mode, the processor is configured to:
based on a determination that the interface device is coupled to the display unit, adjust the magnetic force of the at least one of the plurality of electromagnets to a first value, and
based on a determination that the interface device is uncoupled from the display unit, adjust the magnetic force of the at least one of the plurality of electromagnets to a second value that is smaller than the first value.

11. The vehicle control device of claim 1, wherein the processor is configured to:
determine whether the interface device is coupled to a second region of the display unit and whether a graphic object is fully displayed on the second region of the display unit, and
based on (i) a determination that the interface device is coupled to the second region of the display unit and (ii) a determination that the graphic object is fully displayed on the second region of the display unit, control the display unit to resize the graphic object to be fully displayed in the second region of the display unit.

12. The vehicle control device of claim 1, wherein the processor is configured to:
based on (i) a determination that the interface device is coupled to the first region of the display unit and (ii) a size of the first region, control the display unit to resize a graphic object that is displayed on the display unit.

13. The vehicle control device of claim 1, wherein the interface device includes a touch sensor, and
wherein, based on a determination that the interface device is coupled to the display unit, the processor is configured to:
detect, using the touch sensor, a number of fingers gripping the interface device, and
perform an operation based on the number of fingers detected as gripping the interface device.

14. The vehicle control device of claim 1, wherein the processor is configured to:
determine whether the interface device is coupled to a third region of the display unit, and
based on a determination that the interface device is coupled to the third region of the display unit, control the display module to display second screen information corresponding to first screen information that is displayed on the third region of the display unit.

15. The vehicle control device of claim 14, wherein the display unit includes a plurality of displays including a first display and a second display,
   wherein the interface device further includes:
      a communication unit, and
      a memory,
   wherein, in response to physical user input, the communication unit obtains data about screen information that is displayed on a first region of the first display to which the interface is coupled and the memory stores the data, and
   wherein, in a state in which the interface device is decoupled from the first display and is coupled to the second display, the communication unit provides the data stored in the memory to the second display to display the screen information.

16. The vehicle control device of claim 14, wherein the display module is configured to receive physical user input, and
   wherein the processor is configured to:
      determine whether physical user input is received,
      determine whether the second screen information is displayed on the display module, and
      based on (i) a determination that the physical user input is received and (ii) a determination that the second screen information is displayed on the display module, the processor is configured to control the display unit to stop displaying the first screen information.

17. The vehicle control device of claim 16, wherein the processor is configured to:
   in a state in which the physical user input is received, keep displaying the second screen information on the display module regardless of uncoupling between the interface device and the display unit.

18. The vehicle control device of claim 17, wherein the display unit includes a plurality of displays including a first display displaying the first screen information and a second display, and
   wherein the processor is configured to:
      determine whether the interface device including the display module displaying the second screen information is coupled to the second display, and
      control the second display to display third screen information corresponding to the second screen information.

19. The vehicle control device of claim 18, wherein the processor is configured to:
   based on (i) a determination that the physical user input is received and (ii) a determination that the interface device is coupled to the second display, control the interface device to stop displaying the second screen information.

20. The vehicle control device of claim 18, wherein the first screen information is associated with a first operation and the second screen information is associated with the first operation, and
   wherein the processor is configured to:
      in a state in which the interface device is coupled to the first display, determine whether first physical user input is received,
      based on a determination that the first physical user input is received, stop performing the first operation,
      in a state in which the interface device is coupled to the second display, determine whether second physical user input is received, and
      based on a determination that the second physical user input is received, resume performing the first operation.

21. The vehicle control device of claim 1, wherein the interface device is a detachable interface device detachably attached to the display unit, and
   the interface device is configured to be attachable to the display unit or detachable from the display unit.

22. A vehicle comprising a vehicle control device that includes:
   a display unit;
   an interface device that is configured to be coupled to or uncoupled from the display unit, the interface device including a display module; and
   a processor that is configured to:
      determine whether the interface device is coupled to or uncoupled from the display unit,
      based on a determination that the interface device is coupled to or uncoupled from the display unit, control at least one of the display unit and the interface device,
      determine whether the interface device is coupled to a first region of the display unit,
      based on a determination that the interface device is coupled to the first region of the display unit, control the display module to display screen information that is displayed on the first region of the display unit, and
      based on (i) a determination that the interface device is coupled to the first region of the display unit and (ii) a position of a graphic object that is displayed on the first region of the display unit, control the display unit to move the interface device.

* * * * *